US012753256B2

(12) United States Patent
Mitani

(10) Patent No.: US 12,753,256 B2
(45) Date of Patent: Oct. 6, 2026

(54) FINE RESIN PARTICLE, COATING FILM-SOFTENING AGENT, MATTING AGENT FOR PAINTS, STRESS RELIEVER FOR CURABLE RESINS, LIGHT DIFFUSER, LIGHT DIFFUSING RESIN COMPOSITION, AND RESIN COMPOSITION

(71) Applicant: SEKISUI KASEI CO., LTD., Osaka (JP)

(72) Inventor: Kohei Mitani, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 272 days.

(21) Appl. No.: 18/284,692

(22) PCT Filed: Mar. 30, 2022

(86) PCT No.: PCT/JP2022/016042
§ 371 (c)(1),
(2) Date: Sep. 28, 2023

(87) PCT Pub. No.: WO2022/210893
PCT Pub. Date: Oct. 6, 2022

(65) Prior Publication Data
US 2024/0158553 A1 May 16, 2024

(30) Foreign Application Priority Data
Mar. 31, 2021 (JP) ................................ 2021-060983

(51) Int. Cl.
*C08F 220/18* (2006.01)
*C09D 7/42* (2018.01)
*C09D 133/12* (2006.01)

(52) U.S. Cl.
CPC .......... *C08F 220/1818* (2020.02); *C09D 7/42* (2018.01); *C09D 133/12* (2013.01)

(58) Field of Classification Search
None
See application file for complete search history.

(56) References Cited

U.S. PATENT DOCUMENTS

2011/0160383 A1 6/2011 Kwon et al.
2013/0215184 A1* 8/2013 Koenig ................. D21H 17/45
502/402

(Continued)

FOREIGN PATENT DOCUMENTS

CN 101974117 8/2012
CN 107386007 11/2017

(Continued)

OTHER PUBLICATIONS

Extended European Search Report issued Feb. 4, 2025 in corresponding European Patent Application No. 22781103.1.

(Continued)

*Primary Examiner* — Ronak C Patel
(74) *Attorney, Agent, or Firm* — Wenderoth, Lind & Ponack, L.L.P.

(57) ABSTRACT

The present invention provides a fine resin particle that has superior softness and improved brittleness and may be used in paint compositions, cosmetics, and the like. The fine resin particle of the present invention includes a copolymer that includes an alkyl (meth)acrylate-based monomer (A) unit having a C10-30 alkyl group, an alkyl acrylate-based monomer (B) unit having a C1-5 alkyl group, a vinyl monomer (C) unit having a homopolymer glass transition temperature Tg of 70° C. or higher and one polymerizable unsaturated bond, and a multifunctional (meth)acrylate-based monomer (D) unit.

16 Claims, 11 Drawing Sheets

(56) References Cited

U.S. PATENT DOCUMENTS

| | | | | |
|---|---|---|---|---|
| 2015/0092123 | A1* | 4/2015 | Gotoh | B32B 27/36<br>524/588 |
| 2016/0207865 | A1 | 7/2016 | Gnandesikan et al. | |
| 2019/0384198 | A1* | 12/2019 | Matsui | G03G 9/08797 |
| 2020/0208022 | A1 | 7/2020 | Niwa et al. | |
| 2020/0209775 | A1* | 7/2020 | Tanaka | G03G 9/09716 |
| 2021/0189090 | A1 | 6/2021 | Nakatomi et al. | |

FOREIGN PATENT DOCUMENTS

| | | |
|---|---|---|
| CN | 108752514 | 11/2018 |
| CN | 109134740 | 1/2019 |
| EP | 0 522 454 | 1/1993 |
| JP | 5-65429 | 3/1993 |
| JP | 2002-80774 | 3/2002 |
| JP | 2008-255072 | 10/2008 |
| JP | 2013-227561 | 11/2013 |
| JP | 2016-534131 | 11/2016 |
| JP | 2018-24786 | 2/2018 |
| JP | 2019-219646 | 12/2019 |
| JP | 2020-105309 | 7/2020 |
| KR | 10-2011-0079487 | 7/2011 |
| KR | 10-2018-0110668 | 10/2018 |
| WO | 2017/141653 | 8/2017 |

OTHER PUBLICATIONS

International Search Report issued Jun. 21, 2022 in International (PCT) Application No. PCT/JP2022/016042.

* cited by examiner

FINE RESIN PARTICLE, COATING FILM-SOFTENING AGENT, MATTING AGENT FOR PAINTS, STRESS RELIEVER FOR CURABLE RESINS, LIGHT DIFFUSER, LIGHT DIFFUSING RESIN COMPOSITION, AND RESIN COMPOSITION

TECHNICAL FIELD

The present invention relates to a fine resin particle, a coating film-softening agent, a matting agent for paints, a stress reliever for curable resins, a light diffuser, a light-diffusing resin composition, and a resin composition.

BACKGROUND ART

Conventionally, coating films have been formed on the surface of molded articles made of synthetic resins or metals to improve the appearance and texture of the molded articles. Then, fine resin particles are incorporated into coating films to improve the properties of the coating films.

In addition, cosmetics, including body cosmetics such as body powder or makeup cosmetics such as foundation, contain fine resin particles as cosmetic powder.

As fine resin particles, PTL 1 discloses fine (meth)acrylic particles obtained by polymerizing a monomer composition including 50% to 90% by weight of a monofunctional (meth)acrylic monomer (A) with linear or branched C8-18 alkyl group and 10% to 50% by weight of a monomer (B) with two or more (meth)acrylic groups and showing a 10% compression strength measured by a micro compression tester of 1 to 5 MPa.

Furthermore, PTL 2 discloses crosslinked (meth)acrylic acid ester-based resin particles obtained by copolymerizing monomer components that include at least one monomer selected from acrylic acid esters and methacrylic acid esters and a monomer with a carboxyl group and having a surface, at least part of which is coated with a surfactant having a specific structural formula.

CITATION LIST

Patent Literature

[PTL 1]
Japanese Patent Application Publication No. 2018-24786
[PTL 2]
Japanese Patent Application Publication No. 2008-255072

SUMMARY OF INVENTION

Technical Problem

However, fine acrylic particles of PTL 1 and 2 have insufficient strength.

When the acrylic acid ester-based resin particles mentioned above are included in a paint composition, a problem occurs; that is, when stress is applied to the obtained coating film, the acrylic ester-based resin particles may be damaged, causing buckling and other appearance defects in the coating film.

In addition, fine resin particles are also included to give elasticity to coating films. Fine resin particles with both excellent softness and strength are desired. However, attempts to increase one of softness and brittleness often result in a decrease in the other. Thus, fine resin particles with excellent softness and brittleness are desired.

The present invention provides a fine resin particle that has excellent softness and improved brittleness and may be used in paint compositions, cosmetics, and the like.

Solution to Problem

The fine resin particle of the present invention includes a copolymer (hereinafter also simply referred to as "copolymer") that includes an alkyl (meth)acrylate-based monomer (A) unit having a C10-30 alkyl group, an alkyl acrylate-based monomer (B) unit having a C1-5 alkyl group, a vinyl monomer (C) unit having a homopolymer glass transition temperature Tg of 70° C. or higher and one polymerizable unsaturated bond, and a multifunctional (meth)acrylate monomer-based (D) unit.

In the fine resin particle, the copolymer content is preferably 60% by mass or more, more preferably 70% by mass or more, more preferably 80% by mass or more, more preferably 90% by mass or more, more preferably 95% by mass or more, more preferably 99% by mass or more, and more preferably 100% by mass. When the copolymer content is 60% by mass or more, excellent softness can be imparted to the fine resin particle, and the brittleness of the fine resin particle can be improved.

[Alkyl (meth)acrylate-Based Monomer (A) Unit]

The copolymer includes an alkyl (meth)acrylate-based monomer (A) unit having a C10-30 alkyl group. Hereinafter, the alkyl (meth)acrylate-based monomer (A) unit having a C10-30 alkyl group may be simply referred to as an "alkyl (meth)acrylate-based monomer (A)". In the present invention, a (meth)acrylate means an acrylate or a methacrylate.

The alkyl (meth)acrylate-based monomer (A) has only one polymerizable unsaturated bond and does not form a crosslinking structure with other monomer units. The polymerizable unsaturated bond of the alkyl (meth)acrylate-based monomer (A) means an unsaturated bond that can undergo radical polymerization. The polymerizable unsaturated bond is not particularly limited as long as it can undergo radical polymerization with other monomer units, and examples thereof include ethylenically unsaturated double bonds (double bonds of carbon-carbon atoms), ethylenically unsaturated triple bonds (triple bonds of carbon-carbon atoms), and the like, and ethylenically unsaturated double bonds are preferred.

The alkyl group of the alkyl (meth)acrylate-based monomer (A) may be linear or branched. The carbon number of the alkyl group is 10 or more, preferably 11 or more, more preferably 12 or more, and more preferably 13 or more. The carbon number of the alkyl group is 30 or less, preferably 26 or less, more preferably 22 or less, and more preferably 20 or less. When the carbon number of the alkyl group is within the above range, the softness of the fine resin particle can be increased. In addition, when the carbon number of the alkyl group is within the above range, the alkyl group with an appropriate length can relax overconcentration of crosslink density and increase softness while preventing the decrease of the brittleness of the fine resin particle in the copolymer.

The alkyl group is not particularly limited, and examples thereof include a decyl group, an undecyl group, a dodecyl group, a tridecyl group, a tetradecyl group, a 2-decyltetradecanyl group, a pentadecyl group, a hexadecyl group, a heptadecyl group, a 1-methylnonyl group, a 1-ethyldecyl group, a 1,2-dimethyloctyl group, a 1,2-diethylhexyl group, a cetyl group, a stearyl group, an eicosyl group, a behenyl group, and the like. A decyl group, an undecyl group, a dodecyl group, a tridecyl group, a tetradecyl group, a 2-decyltetradecanyl group, and a pentadecyl group are preferred, and a dodecyl group, a tridecyl group, and a tetradecyl group are more preferred, and a tridecyl group is more preferred.

Hydrogens on the alkyl group of the alkyl (meth)acrylate-based monomer (A) are preferably not substituted. When hydrogens of the alkyl group are not substituted, the oil absorbency of the copolymer can be reduced. A resin composition can be well composed by mixing the fine resin particle with a synthetic resin, and in the resin compositions, the fine resin particle stably maintains excellent softness and improved brittleness for a long period of time.

The alkyl (meth)acrylate-based monomer (A) is not particularly limited, and examples thereof include decyl (meth) acrylate, undecyl (meth)acrylate, lauryl (meth)acrylate, tridecyl (meth)acrylate, tetradecyl (meth)acrylate, 2-decyltetradecanyl (meth)acrylate, pentadecyl (meth)acrylate, hexadecyl (meth)acrylate, heptadecyl (meth)acrylate, stearyl (meth)acrylate, nonadecyl (meth)acrylate, 1-methylnonyl (meth)acrylate, 1-ethyldecyl (meth)acrylate, 1,2-dimethyloctyl (meth)acrylate, 1,2-diethylhexyl (meth)acrylate, eicosyl (meth)acrylate, behenyl (meth)acrylate, and the like. Since the softness of the fine resin particle can be increased, lauryl (meth)acrylate, tridecyl (meth)acrylate, hexadecyl (meth)acrylate, stearyl (meth)acrylate, and eicosyl (meth) acrylate are preferred. The alkyl (meth)acrylate-based monomer (A) may be used alone or as a combination of two or more thereof.

The alkyl (meth)acrylate-based monomer (A) is preferred to be free of the hydrophilic structure described later.

The biomass degree of the homopolymer of the alkyl (meth)acrylate-based monomer (A) is preferably 60% or higher. A 60% or higher biomass degree is preferable because the amount of fossil fuels used can be saved, and environmental impact can be decreased. In the present invention, the biomass degree of a monomer and a polymer refers to a biomass-derived carbon (14C) content in the total carbon atoms, measured in accordance with the method (B) of ASTM D 6866. The biomass degree of a mixture of monomers is that of a polymer obtained by polymerizing a monomer mixture with the same mixing ratio (mass %) as the monomer mixture to be measured, measured in accordance with the method (B) of ASTM D 6866.

The biomass degree of the copolymer is preferably 20% or larger. A 20% or higher biomass degree is preferable because the amount of fossil fuels used can be saved, and environmental impact can be reduced.

The glass transition temperature Tg of the homopolymer of the alkyl (meth)acrylate-based monomer (A) is preferably lower than 70° C., more preferably lower than 50° C., more preferably 40° C. or lower, and more preferably 30° C. or lower. The glass transition temperature Tg of the homopolymer of the alkyl (meth)acrylate-based monomer (A) is preferably −70° C. or higher, more preferably −60° C. or higher, and more preferably −50° C. or higher. When the glass transition temperature Tg of the homopolymer of the alkyl (meth)acrylate-based monomer (A) is lower than 70° C., the softness of the fine resin particle is increased. When the glass transition temperature Tg of the homopolymer of the alkyl (meth)acrylate-based monomer (A) is −70° C. or higher, excessive softness of the fine resin particle and fusion of fine resin particles during drying can be suppressed.

In the present invention, the glass transition temperature Tg of the homopolymer of a monomer is available, for example, from "*Tosou to Toryo* (The finish & paint)" (Toryo Shuppan-Sha K.K., 10 (No. 358), 1982). The glass transition temperature Tg of the homopolymer of a monomer, the glass transition temperature Tg of the homopolymer of which has not been known, is a value measured in the manner described below.

In each monomer unit, when the monomers include only one type of monomer, the glass transition temperature Tg is measured by a method described in JIS K 7121:2012. However, the sampling method and the temperature condition were as follows. 5.5±0.5 mg of a sample was filled with no gaps on the bottom of an aluminum measurement container, and then the aluminum lid was put on. Next, differential scanning colorimetry was carried out using a differential scanning calorimeter. Under the nitrogen gas flow rate of 20 mL/min, the sample was heated and cooled in the following steps to obtain a DSC curve.

(Step 1) The temperature was raised from −70° C. to 200° C. at a rate of 20° C./min and kept for 10 minutes.

(Step 2) A sample was removed immediately and cooled under an environment of 25±10° C.

(Step 3) The temperature was raised from −70° C. to 200° C. at a rate of 20° C./min.

From the resulting DSC curve, the midpoint glass transition temperature observed in the second-time temperature-rising process was calculated using analysis software attached to the apparatus. At this time, aluminum was used as a standard substance. This midpoint glass transition temperature was determined in accordance with this standard (paragraph 9.3). For example, an apparatus commercially available from Hitachi High-Tech Science Corporation under the product name "DSC 7000X, AS-3" can be used as a differential scanning calorimeter.

In each monomer unit, when the monomers include multiple types of monomers, the glass transition temperature Tg is a glass transition temperature Tg of a polymer consisting of multiple types of monomers.

In each monomer unit, when the monomers include multiple types (n types) of monomers, the glass transition temperature Tg is a temperature obtained by converting the glass transition temperature Tg represented by the absolute temperature [K (kelvin)], which is calculated by Expression (1) below, into a Celsius temperature (° C.).

Expression (1) is called the FOX equation and is an equation for calculating the glass transition temperature Tga of a copolymer based on the glass transition temperatures Tgi of homopolymers of individual monomers constituting the copolymer. The detail thereof is described in Bulletin of the American Physical Society, Series 2, vol. 1, No. 3, page 123 (1956).

[Math. 1]

$$1/Tga = \sum_{i=1}^{n}(Wi/Tgi) \qquad (1)$$

In this expression, Tga is the glass transition temperature Tg (K) of a copolymer. Wi is the content (mass fraction) of the i-th monomer. Tgi is the glass transition temperature Tg (K) of the homopolymer of the i-th monomer. $W_1 + W_2 + \ldots + Wn = 1$.

In the present invention, the weight-average molecular weight of a polymer is a value measured in the following manner. First, 50 mg of a polymer is left overnight in 10 mL of first-grade THF (mobile phase) to dissolve the polymer and filtrated through a 0.45 μm or 0.20 μm filter.

Next, the weight-average molecular weight of the polymer is measured using gel permeation chromatography (GPC). Here, the weight-average molecular weight of a polymer means a weight-average molecular weight in terms of polystyrene (PS). Measurement device: GPC HLC-8020, manufactured by TOSOH Corporation Guard column: TOSOH TSKguard column HHR (S)×1 (7.5 mmID×7.5 cm)

Column: TOSOH TSK-GEL GMHHR-H(S)×3 (7.8 mmID×30 cm)

Measurement Condition:

Column temperature (40° C.)

Mobile phase (First-grade THF/45° C.)

S.PUMP/R.PUMP flow rate (0.8/0.5 mL/min)

RI temperature (35° C.) INLET temperature (35° C.)

Measurement time (55 min)

Detector (UV 254 nm, RI)

Standard polystyrene for calibration curves: product name "shodex", manufactured by Showa Denko K.K., weight-average molecular weight: 1,030,000, and a product manufactured by TOSOH Corporation, weight-average molecular weight: 5,480,000, 3,840,000, 355,000, 102,000, 37,900, 9,100, 2,630, 495

The alkyl (meth)acrylate-based monomer (A) unit content in the copolymer is preferably 20 parts by mass or more, more preferably 30 parts by mass or more, and more preferably 40 parts by mass or more in relation to 100 parts by mass of all monomer units. The alkyl (meth)acrylate-based monomer (A) unit content in the copolymer is preferably 85 parts by mass or less, more preferably 80 parts by mass or less, and more preferably 70 parts by mass or less in relation to 100 parts by mass of all monomer units. When the alkyl (meth)acrylate-based monomer (A) unit content is 20 parts by mass or more, the softness of the fine resin particle is increased. The alkyl (meth)acrylate-based monomer (A) unit content of 85 parts by mass or less is preferable because the brittleness of the fine resin particle is improved.

The alkyl (meth)acrylate-based monomer (A) unit content in the copolymer is preferably 20 parts by mass or more, more preferably 30 parts by mass or more, and more preferably 40 parts by mass or more in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. The alkyl (meth) acrylate-based monomer (A) unit content in the copolymer is preferably 85 parts by mass or less, more preferably 80 parts by mass or less, and more preferably 70 parts by mass or less in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. When the alkyl (meth)acrylate-based monomer (A) unit content is 20 parts by mass or more, the softness of the fine resin particle is increased. The alkyl (meth)acrylate-based monomer (A) unit content of 85 parts by mass or less is preferable because the brittleness of the fine resin particle can be improved.

[Alkyl Acrylate-Based Monomer (B) Unit]

The copolymer includes an alkyl acrylate-based monomer (B) unit having a C1-5 alkyl group. Hereinafter, the alkyl acrylate-based monomer (B) unit having a C1-5 alkyl group may be simply referred to as an "alkyl acrylate-based monomer (B)".

The alkyl acrylate-based monomer (B) has only one polymerizable unsaturated bond and does not form a cross-linking structure with other monomer units. The polymerizable unsaturated bond of the alkyl acrylate-based monomer (B) means an unsaturated bond that can undergo radical polymerization. The polymerizable unsaturated bond is not particularly limited as long as it can undergo radical polymerization with other monomer units, and examples thereof include ethylenically unsaturated double bonds (double bonds of carbon-carbon atoms), ethylenically unsaturated triple bonds (triple bonds of carbon-carbon atoms), and the like, and ethylenically unsaturated double bonds are preferred.

The alkyl acrylate-based monomer (B) is not particularly limited, and examples thereof include methyl acrylate, ethyl acrylate, propyl acrylate, isopropyl acrylate, n-butyl acrylate, isobutyl acrylate, sec-butyl acrylate, ter-butyl acrylate, n-pentyl acrylate, isopentyl acrylate, and the like, and methyl acrylate and butyl acrylate are preferred. The alkyl acrylate-based monomer (B) may be used alone or as a combination of two or more thereof.

The carbon number of the alkyl group in the alkyl acrylate-based monomer (B) is 1 or more, preferably 2 or more, and more preferably 3 or more. The carbon number of the alkyl group in the alkyl acrylate-based monomer (B) is 5 or less and more preferably 4 or less. The softness of the fine resin particles can be increased by setting the carbon number of the alkyl group in the above range.

The alkyl acrylate-based monomer (B) is preferred to be free of the hydrophilic structure described later.

The glass transition temperature Tg of the homopolymer of the alkyl acrylate-based monomer (B) is preferably lower than 50° C., more preferably 40° C. or lower, and more preferably 30° C. or lower. The glass transition temperature Tg of the homopolymer of the alkyl (meth)acrylate-based monomer (A) is preferably −80° C. or higher, more preferably −70° C. or higher, and more preferably −60° C. or higher. When the glass transition temperature Tg of the homopolymer of the alkyl acrylate-based monomer (B) is lower than 50° C., the softness of the fine resin particle is increased. When the glass transition temperature Tg of the homopolymer of the alkyl acrylate-based monomer (B) is −80° C. or higher, an appropriate softness can be imparted to the fine resin particle, and fusion of the fine resin particles during drying can be suppressed.

The alkyl acrylate-based monomer (B) unit content in the copolymer is preferably 5 parts by mass or more and more preferably 10 parts by mass or more in relation to 100 parts by mass of all monomer units. The alkyl acrylate-based monomer (B) unit content in the copolymer is preferably 40 parts by mass or less, more preferably 30 parts by mass or less, more preferably 25 parts by mass or less, and more preferably 20 parts by mass or less in relation to 100 parts by mass of all monomer units. When the alkyl acrylate-based monomer (B) unit content is 5 parts by mass or more, the softness of the fine resin particle can be increased. When the alkyl acrylate-based monomer (B) unit content is 40 parts by mass or less, excessive softness of the fine resin particle and fusion of fine resin particles during drying can be suppressed.

The alkyl acrylate-based monomer (B) unit content in the copolymer is preferably 5 parts by mass or more and more preferably 10 parts by mass or more in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. The alkyl acrylate-based monomer (B) unit content in the copolymer is preferably 40 parts by mass or less, more preferably 30 parts by mass or less, more preferably 25 parts by mass or less, and more preferably 20 parts by mass or less in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. When the alkyl acrylate-based monomer (B) unit content is 5 parts by mass or more, the softness of the fine resin particle can be increased. When the alkyl acrylate-based monomer (B) unit content is 40 parts by mass or less, excessive softness of the fine resin particle and fusion of fine resin particles during drying can be suppressed.

[Vinyl Monomer (C) Unit]

The copolymer has a vinyl monomer (C) unit with a homopolymer glass transition temperature Tg of 70° C. or higher and one polymerizable unsaturated bond. The vinyl monomer (C) unit having a homopolymer glass transition temperature Tg of 70° C. or higher and one polymerizable unsaturated bond may be simply referred to as a "vinyl monomer (C)".

The vinyl monomer (C) has only one polymerizable unsaturated bond and does not form a crosslinking structure with other monomer units.

The polymerizable unsaturated bond of the vinyl monomer (C) means an unsaturated bond that can undergo radical polymerization. The polymerizable unsaturated bond is not particularly limited as long as it can undergo radical polymerization with other monomer units, and examples thereof include ethylenically unsaturated double bonds (double bonds of carbon-carbon atoms), ethylenically unsaturated triple bonds (triple bonds of carbon-carbon atoms), and the like, and ethylenically unsaturated double bonds are preferred.

The glass transition temperature Tg of the homopolymer of the vinyl monomer (C) is 70° C. or higher, preferably 80° C. or higher, and more preferably 90° C. or higher. The glass transition temperature Tg of the homopolymer of the vinyl monomer (C) is preferably 150° C. or lower and more preferably 120° C. or lower. When the glass transition temperature Tg of the homopolymer of the vinyl monomer (C) is 70° C. or higher, the contribution to improving the brittleness of the fine resin particle is considered significant.

The vinyl monomer (C) is not particularly limited as long as it has a homopolymer glass transition temperature Tg of 70° C. or higher and one polymerizable unsaturated bond. Examples of the vinyl monomer (C) include methyl methacrylate, styrene, acrylamide, acrylonitrile, dicyclopentanyl (meth)acrylate, glycerol formal (meth)acrylate, and the like. Since the brittleness of the fine resin particle can be improved, styrene and methyl methacrylate are preferred. The vinyl monomer (C) may be used alone or as a combination of two or more thereof.

The vinyl monomer (C) is preferred to be free of the hydrophilic structure described later.

The vinyl monomer (C) unit content in the copolymer is preferably 5 parts by mass or more and more preferably 10 parts by mass or more in relation to 100 parts by mass of all monomer units. The vinyl monomer (C) unit content in the copolymer is preferably 30 parts by mass or less and more preferably 25 parts by mass or less in relation to 100 parts by mass of all monomer units. When the vinyl monomer (C) content is 5 parts by mass or more, the contribution to improving the brittleness of the fine resin particle is considered significant. When the vinyl monomer (C) unit content is 30 parts by mass or less, the softness of the fine resin particle can be increased.

The vinyl monomer (C) unit content in the copolymer is preferably 5 parts by mass or more and preferably 10 parts by mass or more in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. The vinyl monomer (C) unit content in the copolymer is more preferably 30 parts by mass or less and more preferably 25 parts by mass or less in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. When the vinyl monomer (C) unit content is 5 parts by mass or more, the contribution to improving the brittleness of the fine resin particle is considered significant. When the vinyl monomer (C) unit content is 30 parts by mass or less, the softness of the fine resin particle can be increased.

In the copolymer, the content of alkyl (meth)acrylate-based monomer units having C1-3 alkyl groups is preferably 25 parts by mass or less in relation to 100 parts by mass of the total of the alkyl (meth)acrylate-based monomer units. When the total content of alkyl (meth)acrylate-based monomer units having C1-3 alkyl groups is 25 parts by mass or less, the softness of the fine resin particle can be increased.

In the copolymer, the content of alkyl (meth)acrylate-based monomer units having C1-3 alkyl groups is preferably 5 parts by mass or more in relation to 100 parts by mass of the total of the alkyl (meth)acrylate-based monomer units. When the total content of alkyl (meth)acrylate-based monomer units having C1-3 alkyl groups is 5 parts by mass or more, the brittleness of the fine resin particle can be improved.

In the copolymer, the mass ratio of the content of the vinyl monomer (C) unit having a homopolymer glass transition temperature Tg of 70° C. or higher and one polymerizable unsaturated bond to the content of the multifunctional (meth)acrylate monomer (D) unit [vinyl monomer (C) unit content/multifunctional (meth)acrylate-based monomer (D) unit content] is preferably 0.3 or more, more preferably 0.4 or more, and more preferably 0.5 or more. When the mass ratio of the vinyl monomer (C) unit content to the multifunctional (meth)acrylate-based monomer (D) unit content is 0.3 or more, the softness can be increased, and the brittleness can be sufficiently improved in the fine resin particle.

In the copolymer, the mass ratio of the content of the vinyl monomer (C) unit having a homopolymer glass transition temperature Tg of 70° C. or higher and one polymerizable unsaturated bond to the content of the multifunctional (meth)acrylate monomer (D) unit [vinyl monomer (C) unit content/multifunctional (meth)acrylate-based monomer (D) unit content] is preferably 2 or less and more preferably 1 or less. When the mass ratio of the vinyl monomer (C) unit content to the multifunctional (meth)acrylate-based monomer (D) unit content is 2 or less, the coalescence of fine resin particles in the drying step for producing the fine resin particles can be reduced, and the softness of the fine resin particle can be increased.

[Multifunctional (meth)acrylate-Based Monomer (D) Unit]

The copolymer includes a multifunctional (meth)acrylate-based monomer (D) unit. The multifunctional (meth)acrylate-based monomer (D) unit has a plurality of polymerizable unsaturated bonds in a molecule and preferably has a plurality of (meth)acryloyl groups in a molecule. The multifunctional (meth)acrylate-based monomers (D) polymerize with each other or with other monomers to form a cross-linked structure, thereby improving the brittleness of the fine resin particle and increasing the oil resistance of the fine resin particle. It should be noted that a (meth)acryloyl group means an acryloyl group or a methacryloyl group.

The polymerizable unsaturated bond of the multifunctional (meth)acrylate-based monomer (D) means an unsaturated bond that can undergo radical polymerization. The polymerizable unsaturated bond is not particularly limited as long as it can undergo radical polymerization with other monomer units, and examples thereof include ethylenically unsaturated double bonds (double bonds of carbon-carbon atoms), ethylenically unsaturated triple bonds (triple bonds of carbon-carbon atoms), and the like, and ethylenically unsaturated double bonds are preferred.

The multifunctional (meth)acrylate-based monomer (D) is not particularly limited, and examples thereof include ethylene glycol di(meth)acrylate, diethylene glycol di(meth) acrylate, triethylene glycol di(meth)acrylate, decaethylene glycol di(meth)acrylate, pentadecaethylene glycol di(meth) acrylate, pentacontahectaethylene glycol di(meth)acrylate, 1,3-butylene di(meth)acrylate, 1,6-hexa di(meth)acrylate, 1,9-nonane di(meth)acrylate, 1,10-decane di(meth)acrylate, allyl (meth)acrylate, trimethylolpropane tri(meth)acrylate, pentaerythritol tetraacrylate, dipentaerythritol hexa(meth) acrylate, and the like. Among these, bifunctional (meth) acrylate monomers, such as ethylene glycol di(meth)acrylate (ethylene glycol dimethacrylate), 1,6-hexane di(meth)acrylate, 1,9-nonane di(meth)acrylate, 1,10-decane di(meth) acrylate, and allyl (meth)acrylate (allyl methacrylate) are preferred. These multifunctional (meth)acrylate-based monomer (D) may be used alone or as a combination of two or more thereof.

The multifunctional (meth)acrylate-based monomer (D) unit content in the copolymer is preferably 5 parts by mass or more, more preferably 7 parts by mass or more, more preferably 9 parts by mass or more, and more preferably 10 parts by mass or more in relation to 100 parts by mass of all monomer units. The multifunctional (meth)acrylate-based monomer (D) unit content in the copolymer is preferably 50 parts by mass or less, more preferably 40 parts by mass or less, and more preferably 30 parts by mass or less. When the multifunctional (meth)acrylate-based monomer (D) unit content is 5 parts by mass or more, the brittleness of the fine resin particle can be improved, and the oil resistance of the fine resin particle can be increased. When the multifunctional (meth)acrylate-based monomer (D) unit content is 50 parts by mass or less, the softness of the fine resin particle can be increased.

The multifunctional (meth)acrylic monomer (D) unit content in the copolymer is preferably 5 parts by mass or more, more preferably 7 parts by mass or more, more preferably 9 parts by mass or more, and preferably 10 parts by mass or more in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. The multifunctional (meth)acrylic monomer (D) unit content in the copolymer is preferably 50 parts by mass or less, more preferably 40 parts by mass or less, and more preferably 30 parts by mass or less in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. When the multifunctional (meth) acrylic monomer (D) unit content is 5 parts by mass or more, the brittleness of the fine resin particle can be improved, and the oil resistance of the fine resin particle can be increased. When the multifunctional (meth)acrylic monomer (D) unit content is 50 parts by mass or less, the softness of the fine resin particle can be increased.

[Other Monomer (E) Units]

The copolymer may include other monomer (E) units than the alkyl (meth)acrylate-based monomer (A) unit, the alkyl acrylate-based monomer (B) unit, the vinyl monomer (C) unit, and the multifunctional (meth)acrylic monomer (D) unit.

The monomer (E) has only one polymerizable unsaturated bond and does not form a crosslinking structure with other monomer units because the monomer (E) can be actively made to exist on the surface of the fine resin particle. The polymerizable unsaturated bond of the monomer (E) means an unsaturated bond that can undergo radical polymerization. The polymerizable unsaturated bond is not particularly limited as long as it can undergo radical polymerization with other monomer units, and examples thereof include ethylenically unsaturated double bonds (double bonds of carbon-carbon atoms), ethylenically unsaturated triple bonds (triple bonds of carbon-carbon atoms), and the like, and ethylenically unsaturated double bonds are preferred. The polymerizable unsaturated bonds of the monomer (E), vinyl monomer (C), and multifunctional (meth)acrylate-based monomer (D) may be identical to or differ from one another.

It is preferred that the monomer (E) unit has a hydrophilic structure in a molecule because the dispersibility of the copolymer in aqueous media can be increased while maintaining the dispersibility of the copolymer in organic media. A hydrophilic structure is a molecular structure with an excellent affinity for water, and examples thereof include a hydroxyl group (—OH), a carboxy group (—COOH), a polyoxyalkylene structure, and the like.

A polyoxyalkylene structure means a structure represented by the following formula (1).

$$—(O—R^1)_n— \tag{1}$$

(wherein $R^1$ denotes a C1-4 alkylene group, and n denotes the number of repeating units and is a positive integer.)

An alkylene group is a bivalent atomic group generated by removing (drawing out) two hydrogen atoms respectively bonded to two different carbon atoms in an aliphatic saturated hydrocarbon and encompasses both linear and branched atomic groups. The term "branched" encompasses cases where one carbon (a methyl group) is bonded as a side chain.

Examples of alkylene groups include an ethylene group, a propylene group [$—CH_2—CH_2—CH_2—$ (a trimethylene group), $—CH(CH_3)—CH_2—$], a butylene group, and the like.

A polyoxyalkylene structure may be composed of only one type of repeating unit or two or more types of repeating units. Examples of polyoxyalkylene structures include polyoxyethylene structures, polyoxypropylene structures, polyoxybutylene structures, polyoxytetramethylene structures, polyoxyethylene-polyoxypropylene structures, polyoxypropylene-polyoxybutylene structures, and the like.

The monomer (E) is not particularly limited, and examples thereof include (meth)acrylic acid, 2-methacryloyloxyethyl succinate, polyethylene glycol monomethacrylate, polypropylene glycol monomethacrylate, polyethylene glycol-propylene glycol monomethacrylate, polyethylene glycol-tetramethylene glycol monomethacrylate, propylene-polybutylene glycol monomethacrylate, and the like.

The monomer (E) unit content in the copolymer is preferably 1 part by mass or more and more preferably 5 parts by mass or more in relation to 100 parts by mass of all monomer units. The monomer (E) unit content in the copolymer is preferably 40 parts by mass or less, more preferably 30 parts by mass or less, and more preferably 20 parts by mass or less in relation to 100 parts by mass of all monomer units. When the monomer (E) unit content is 1 part by mass or more, the affinity of the copolymer for aqueous media is increased. When the monomer (E) content is 40 parts by mass or less, the affinity of the copolymer for organic media is increased.

The monomer (E) unit content in the copolymer is preferably 1 part by mass or more and preferably 5 parts by mass or more in relation to 100 parts by mass of the total of the alkyl (meth)acrylate-based monomer (A) unit, the alkyl acrylate-based monomer (B) unit, the vinyl monomer (C) unit, the multifunctional (meth)acrylate-based monomer (D) unit, and the monomer (E) unit. The monomer (E) unit content in the copolymer is preferably 40 parts by mass or less, more preferably 30 parts by mass or less, and more preferably 20 parts by mass or less in relation to 100 parts by mass of the total of the alkyl (meth)acrylate-based monomer (A) unit, the alkyl acrylate-based monomer (B) unit, the vinyl monomer (C) unit, the multifunctional (meth) acrylate-based monomer (D) unit, and the monomer (E) unit. When the monomer (E) unit content is 1 part by mass or more, the affinity of the copolymer for aqueous media is increased. When the monomer (E) content is 40 parts by mass or less, the affinity of the copolymer for organic media is increased.

[Thiol-Based Compound (F) Unit]

The copolymer includes the alkyl (meth)acrylate-based monomer (A) unit, the alkyl acrylate-based monomer (B) unit, the vinyl monomer (C) unit, and the multifunctional (meth)acrylate-based monomer (D) unit, and may further include a thiol-based compound (F) unit.

The thiol-based compound (F) functions as a chain transfer agent during the polymerization of the copolymer and constitutes the structural units of the fine polymer particle. In a radical polymerization system in which the alkyl (meth)acrylate-based monomer (A) having a C10-30 alkyl group, the alkyl acrylate-based monomer (B) having a C1-5 alkyl group, the vinyl monomer (C) having a homopolymer glass transition temperature Tg of 70° C. or higher and one polymerizable unsaturated bond, and the multifunctional (meth)acrylate-based monomer (D) are polymerized, the thiol-based compound receives a radical from a growing polymer chain to terminate the growth of the polymer chain and generates a new radical to initiate the growing reaction of another polymer chain.

The thiol-based compound (F) is not particularly limited as long as it has one or more thiol groups in a molecule.

The thiol-based compound (F) includes monofunctional thiols and multifunctional thiols. The thiol-based compound (F) may be used alone or as a combination of two or more thereof.

A monofunctional thiol has only one thiol group (—SH) in a molecule. Examples of monofunctional thiols include thiol compounds, such as 1-butanethiol, 1-octanethiol (n-octylmercaptan), 1-decanethiol, 1-dodecanethiol, 1-hexadecanethiol, and tert-dodecanethiol; acid compounds with thiol groups, such as thioglycolic acid, 3-mercaptopropionic acid, and mercaptosuccinic acid, esters thereof, and the like.

A multifunctional thiol has a plurality of thiol groups (—SH) in a molecule. Examples of multifunctional thiols include 1,2-ethanedithiol, 1,3-propanedithiol, 1,4-butanedithiol, 1,6-hexanedithiol, 1,8-octanedithiol, 1,2-cyclohexanedithiol, decanedithiol, ethylene glycol bis(thioglycolate), ethylene glycol bis(thiopropionate), ethylene glycol bis (thioglycolate) (EGTG), 1,4-butanediol bis(thiopropionate) (BDTG), trimethylolpropane tris(thioglycolate) (TMTG), trimethylolpropane tris(thiopropionate), pentaerythritol tetrakis(thioglycolate) (PETG), pentaerythritol tetrakis(thiopropionate), dipentaerythritol hexathiopropionate, trimercaptopropionic acid tris(2-hydroxyethyl)isocyanurate, 1,4-dimethylmercaptobenzene, 2,4,6-trimercapto-s-triazine, 2-(N,N-dibutylamino)-4,6-dimercapto-s-triazine, and the like.

The thiol-based compound (F) is preferably ethylene glycol bis(thioglycolate) (EGTG), 1,4-butanediol bis(thiopropionate) (BDTG), trimethylolpropane tris(thioglycolate) (TMTG), pentaerythritol tetrakis(thioglycolate) (PETG), or n-octylmercaptan, and more preferably pentaerythritol tetrakis(thioglycolate) (PETG) or n-octylmercaptan.

The thiol-based compound (F) unit content in the copolymer is preferably 0.1 parts by mass or more, more preferably 0.2 parts by mass or more, and more preferably 0.3 parts by mass or more in relation to 100 parts by mass of all monomer units. The thiol-based compound (F) unit content in the copolymer is preferably 3 parts by mass or less, more preferably 2 parts by mass or less, and more preferably 1 part by mass or less in relation to 100 parts by mass of all monomer units. When the thiol-based compound (F) unit content is 0.1 parts by mass or more, the heat resistance of the fine resin particle under an air atmosphere and a nitrogen atmosphere (in particular, under a nitrogen atmosphere) increases. When the thiol-based compound (F) content is 3 parts by mass or less, odors caused by thiol-based compounds can be reduced in the fine resin particle. It should be noted that “all monomer units” mentioned above do not include the thiol-based compound (F).

The thiol-based compound (F) unit content in the copolymer is preferably 0.1 parts by mass or more, more preferably 0.2 parts by mass or more, and more preferably 0.3 parts by mass or more in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit. The thiol-based compound (F) unit content in the copolymer is preferably 3 parts by mass or less, more preferably 2 parts by mass or less, and more preferably 1 part by mass or less in relation to 100 parts by mass of the total of the alkyl (meth)acrylate-based monomer (A) unit, the alkyl acrylate-based monomer (B) unit, the vinyl monomer (C) unit, and the multifunctional (meth) acrylate-based monomer (D) unit. When the thiol-based compound (F) unit content is 0.1 parts by mass or more, the heat resistance of the fine resin particle under an air atmosphere and nitrogen atmosphere (in particular, under a nitrogen atmosphere) increases. When the thiol-based compound (F) content is 3 parts by mass or less, odors caused by thiol-based compounds can be reduced in the fine resin particle.

[Fine Resin Particle]

The fine resin particle contains a copolymer. The copolymer includes the (meth)acrylate-based monomer (A) unit, the alkyl acrylate-based monomer (B) unit, the vinyl monomer (C) unit, and the multifunctional (meth)acrylate-based monomer (D) unit.

The copolymer includes the monomers (A) to (D) units described above, and the fine resin particle including these monomer (A) to (D) units has excellent softness and improved brittleness.

Specifically, the (meth)acrylate-based monomer (A) has a C10-30 alkyl group, which is a long-chain alkyl group. The alkyl (meth)acrylate-based monomer (A) with a long-chain alkyl group has a relatively low homopolymer glass transition temperature Tg, and the copolymer thus shows softness. Although not clearly elucidated, it is speculated that the presence of long-chain alkyl groups prevents the formation of excessive crosslink density in the copolymer with a crosslinked structure, which may increase the softness of the fine resin particle. However, the invention is not bound to this speculation.

The copolymer has a multifunctional (meth)acrylate-based monomer (D) unit, and this monomer (D) unit forms a crosslinked structure. However, the brittleness of the fine resin particle cannot be improved only by forming a crosslinked structure of the multifunctional (meth)acrylate-based monomer (D) unit.

Then, to improve brittleness without impairing the softness of the fine resin particle, the copolymer includes a specific alkyl acrylate-based monomer (B) unit to increase the softness of the fine resin particle and a vinyl monomer (C) unit to improve the brittleness of the fine resin particle.

As such, the copolymer has a combination of specific monomer units to impart excellent softness and improved brittleness to the fine resin particle.

Regarding the copolymer including the alkyl (meth)acrylate-based monomer (A) unit having a C10-30 alkyl group, the alkyl acrylate-based monomer (B) unit having a C1-5 alkyl group, and the vinyl monomer (C) unit having a homopolymer glass transition temperature Tg of 70° C. or higher and one polymerizable unsaturated bond, the glass transition temperature Tg calculated by Expression (1) is preferably lower than 30° C. and more preferably lower than 10° C. When the glass transition temperature Tg of the copolymer is less than 30° C., the softness of the fine resin particle can be increased.

The glass transition temperature Tg of the copolymer is calculated similarly to the procedure for calculating the glass transition temperature Tg of the copolymer when the monomer units include multiple types of monomers. The glass transition temperature Tg of the copolymer is calculated by Expression (1) based on the glass transition temperature Tg (K) of the homopolymer of monomers contained in the copolymer and the monomer content (mass fraction).

The primary particles of the fine resin particle are not flowable. The term "flowable" means that the fine resin particles have the property of being irrecoverably deformed when a load of 9.81 mN is applied to the fine resin particle or that the fine resin particle is viscous or in a liquid-like state. Accordingly, when a load of 9.81 mN is applied to the fine resin particle, the fine resin particle is not deformed, or even if deformed, the fine resin particle restores to the original shape when the pressing force is removed. The fine resin particle can constitute a resin composition by being mixed with a synthetic resin, and in the synthetic resin, excellent softness and improved brittleness can be stably maintained for a long period of time.

The compressive strength at 10% compressive strength upon initial compression at 25° C. of the primary particles of the fine resin particle (S10 strength) (hereinafter, also simply referred to as the "compressive strength at 10% compressive strength" or "S10 strength") is preferably 1 MPa or higher, more preferably 2 MPa or higher, and more preferably 3 MPa or higher. The compressive strength at 10% compressive strength upon initial compression at 25° C. of the primary particles of the fine resin particle is preferably 10 MPa or lower, preferably 8 MPa or lower, and preferably 7 MPa or lower. When the compressive strength is within the above range, an appropriate softness can be imparted to the fine resin particle, and the fusion of fine resin particles during drying can be suppressed.

Measurement targets of S10 strengths are primary particles with a particle diameter within the range of 0.95 to 1.05 times the volume average particle diameter of the primary particles of the fine resin particle [Expression (2)]. The particle diameter of the primary particles to be measured is the length of the longest straight line among lines connecting any two points on the outline that forms the outer shape of a particle when viewed from the plane.

$$\text{(Volume Average Particle Diameter of Primary particles)} \times 0.95 \leq \text{Particle diameter to be measured} \leq \text{(Volume average particle diameter of primary particles)} \times 1.05 \quad (2)$$

The compressive strength at 10% compressive strength upon initial compression at 25° C. of the primary particles of the fine resin particle is measured in the manner described below.

The compressive strength at 10% compressive strength was measured using a micro compression tester, "MCTM-210", manufactured by Shimadzu Corporation under the following measurement conditions. Specifically, fine resin particles are set on a mirror-finished SKS flat plate, and one independent primary particle (a state where other fine resin particles do not exist at least in the range of a diameter of 100 μm) is selected using an optical microscope under an environment at a room temperature of 25° C. and a relative humidity of 50±20%. The diameter (particle diameter) of the selected primary particle is measured with a particle diameter measurement cursor of the micro compression tester to confirm that Expression (2) is satisfied.

A load is gradually applied to the fine resin particle until the load reaches the maximum load of 9.81 mN by lowering the test indenter at the apex of the selected primary particle at the loading rate described below. The compressive strength (S10 strength) is calculated by the following expression based on the load when the diameter of the primary particle is displaced by 10% (1 μm displacement). Measurements are performed six times on the primary particles, and the arithmetic mean of the four compressive strengths, excluding the maximum and minimum compressive strengths, is taken as the "compressive strength at 10% compressive strength".

<Expression for Calculating Compression Strength>

$$\text{Compressive strength } (MPa) = 2.8 \times \text{load } (N) / \left\{ \prod \times (\text{Average diameter (mm) or primary particles})^2 \right\}$$

<Measurement Condition of Compression Strength>

Test temperature: 25° C., relative humidity: 50±20%

Upper pressure indenter: a flat indenter with a diameter of 50 μm (material: diamond)

Lower pressure plate: SKS flat plate

Test type: Compression test (MODE 1)

Test load: 9.81 mN

Loading speed: 0.732 mN/sec

In general, even in the case of fine resin particles with identical composition, the larger the particle diameter is, the lower the S10 strength is. Accordingly, it is preferred that the S10 strength of the primary particles be within the range listed in Table 1 according to the volume average particle diameter of the primary particles of the fine resin particle. It should be noted that a range of the S10 strength listed in other than Table 1 includes both upper and lower limits. In the volume average particle diameter listed in Table 1, the upper limit of the range is included, but the lower limit is not.

TABLE 1

| Volume average particle diameter (μm) | S10 strength (MPa) |
|---|---|
| <1 | 3 to 10 |
| 1 to 10 | 2.5 to 9.5 |
| 10 to 20 | 2 to 9 |
| 20 to 30 | 1.5 to 8.5 |
| 40 to 50 | 1 to 8 |
| >50 | 1 to 5 |

It is preferred that the fine resin particle shows no inflection point in the compressive displacement-compressive load curve in a compression test when the fine resin particle is compressed to a load of 9.81 mN. When there is no inflection point, damage to the fine resin particle can be reduced due to improved brittleness of the fine resin particle, even if shear stress is applied to the fine resin particle. Here, the inflection point is a portion at which the compressive displacement increases sharply in a compressive displacement-compressive load curve in a compression test. A portion at which the compressive displacement increases sharply (exceeding 0.3 μm) for a slight change (change by 0.1 mN) in compressive load in a state where the particle diameter of the primary particle of the resin fine particle is compressed by 20% or more is called the "inflection point". A compressive displacement-compressive load curve in a compression test is obtained in the manner for measuring the compressive strength at 10% compressive strength described above.

The volume average particle diameter of the primary particles of the fine resin particle only needs to be adjusted as appropriate according to the uses. The volume average particle diameter of the primary particles of the fine resin particle is preferably 1 μm or larger, more preferably 3 μm or larger, and more preferably 5 μm or larger. The volume average particle diameter of the primary particles of the fine resin particle is preferably 100 μm or smaller, more preferably 50 μm or smaller, and more preferably 30 μm or smaller.

The coefficient of variation (CV value) of the primary particles of the fine resin particles may be adjusted, as appropriate, according to the applications. The coefficient of variation (CV value) of the primary particles of the fine resin particle is preferably 50% or smaller, more preferably 45% or smaller, and more preferably 40% or smaller.

The volume average particle diameter and coefficient of variation (CV value) of the primary particles of the fine resin particle are measured in the following manner. The volume average particle diameter and coefficient of variation (CV value) of the primary particles of the fine resin particle are measured using a measurement apparatus commercially available from Beckman Coulter, Inc. as a product name "Coulter Multisizer III". Measurements are performed using an aperture calibrated according to the Multisizer™ 3 User's Manual, published by Beckman Coulter, Inc.

A suitable aperture used for the measurement is selected such that, for example, when the assumed volume average particle diameter of the fine resin particles to be measured is 1 μm or larger and 10 μm or smaller, an aperture with a size of 50 μm is selected, when the assumed volume average particle diameter of the fine resin particles to be measured is larger than 10 μm and 30 μm or smaller, an aperture with a size of 100 μm is selected, and when the assumed volume average particle diameter of the fine resin particles to be measured is larger than 30 μm and 90 μm or smaller, an aperture with a size of 280 μm is selected. When the volume average particle diameter measured differs from the assumed volume average particle diameter, the aperture is changed to one with a suitable size, and measurement is performed again.

When an aperture with a size of 50 μm is selected, the Current (aperture current) is set to −800, and the Gain is set to 4. When an aperture with a size of 100 μm is selected, the Current (aperture current) is set to −1,600, and the Gain is set to 2. When apertures with sizes of 280 μm and 400 μm are selected, the Current (aperture current) is set to −3,200, and the Gain is set to 1.

A sample for measurement used is a dispersion obtained by dispersing 0.1 g of fine resin particles in 10 mL of an aqueous solution of 0.1% by mass of a nonionic surfactant (manufactured by Kao Corporation, product name "PELEX SS-H") using a touch mixer ("TOUCH MIXER MT-31", manufactured by Yamato Scientific Co., Ltd.,) and an ultrasonic cleaner (manufactured by VELVO-CLEAR K.K., "ULTRASONIC CLEANER VS-150").

A beaker filled with ISOTON (registered trademark) II (an electrolyte for measurement, manufactured by Beckman Coulter Inc.) is set to a measurement unit of Coulter Multisizer III, and while mildly stirring the inside of the beaker, the above dispersion is added dropwise such that the densitometer reading on the main unit screen of the Coulter Multisizer III be adjusted to 5-10%, and then the measurement is started. During the measurement, the inside of the beaker is stirred mildly enough to prevent air bubbles from entering, and the measurement is finished when the 100,000 fine resin particles are measured. The volume average particle diameter of fine resin particles is an arithmetic mean in the particle diameter distribution of 100,000 particles on a volume basis. The coefficient of variation (CV value) is a value calculated from Expression (3) and expresses the data distribution width.

$$\text{Coefficient of variation } (CV \text{ value}) (\%) = \text{Standard deviation} \times 100 / \text{Volume average primary particle size} \quad (3)$$

In the fine resin particle, the total amount of residual monomers in relation to the total mass of the fine resin particle is preferably 1,000 ppm or less. When the total amount of residual monomers in the fine resin particle is 1,000 ppm or less, the fine resin particle used as a coating film-softening agent or a matting agent for paints can suppress the penetration of synthetic resins into the fine resin particle due to the affinity between residual monomers and the synthetic resins in the resin fine particle and stably maintain excellent softness and a brittleness improving effect of the resin fine particle over a long period of time.

In the fine resin particle, the total amount of residual monomers in relation to the total mass of the fine resin particle is preferably 1,000 ppm or less. When the total amount of residual monomers in the fine resin particle is 1,000 ppm or less, the fine resin particle used as a coating film-softening agent or a matting agent for paints can suppress the penetration of synthetic resins into the fine resin particle due to the affinity between residual monomers and the synthetic resins in the resin fine particle and stably maintain excellent softness and a brittleness improving effect of the resin fine particle over a long period of time.

In the fine resin particle, the total amount of residual monomers of the alkyl (meth)acrylate-based monomer (A) unit, alkyl acrylate-based monomer (B) unit, and the vinyl monomer (C) unit in relation to the total mass of the fine resin particle is preferably 1,000 ppm or less. When the total amount of residual monomers in the fine resin particle is 1,000 ppm or less, the fine resin particle used as a coating film-softening agent or a matting agent for paints can suppress the penetration of synthetic resins into the fine resin particle due to the affinity between residual monomers and the synthetic resins in the resin fine particle and stably maintain excellent softness and a brittleness improving effect of the resin fine particle over a long period of time.

The residual monomer amount in the fine resin particle can be measured using ultra-high-performance liquid chromatography (UHPLC). Specifically, 5 mL of methanol is added to 0.01 g of fine resin particle, thoroughly mixed, and allowed to stand for 24 hours to prepare a dispersion solution. Next, the dispersion is treated by a centrifuge for 30 minutes at a stirring rotation speed of 18,500 rpm to precipitate undissolved matters and obtain a supernatant liquid. A portion of 2 μL of the resulting supernatant liquid is analyzed using an ultra-high-performance liquid chromatogram, La Chrom Ultra (manufactured by Hitachi High-Technologies Corporation), to measure a residual monomer amount in the fine resin particle.

The measurement conditions are as follows: La Chrom Ultra C18 2 μm is used as the column, and the column temperature is set to 40° C. A mixture containing 0.05% aqueous trifluoroacetic acid solution and acetonitrile in a mass ratio 1:1 is used as a solvent, and the flow rate is set to 0.6 mL/min.

The thermal decomposition initiation temperature of the fine resin particle under a nitrogen atmosphere is preferably 280° C. or higher and more preferably 300° C. or higher. The thermal decomposition initiation temperature of the fine resin particle under a nitrogen atmosphere is preferably 360° C. or lower and more preferably 350° C. or lower. When the thermal decomposition initiation temperature of the fine resin particle under a nitrogen atmosphere is 280° C. or higher, cleavage of the main and cross-linked chains of the copolymer constituting the fine resin particle can be reduced even under the heating atmosphere, and the brittleness of the fine resin particle can be improved.

The thermal decomposition initiation temperature of the fine resin particle under an air atmosphere is preferably 280° C. or higher and more preferably 300° C. or higher. The thermal decomposition initiation temperature of the fine resin particle under an air atmosphere is preferably 330° C. or lower and more preferably 320° C. or lower. When the thermal decomposition initiation temperature of the fine resin particle under an air atmosphere is 280° C. or higher, cleavage of the main and cross-linked chains of the copolymer constituting the fine resin particle can be reduced even under the heating atmosphere, and the brittleness of the fine resin particle can be improved.

The thermal decomposition initiation temperatures of the fine resin particle under a nitrogen atmosphere or an air atmosphere are determined using a simultaneous thermogravimetry/differential thermal analyzer by thermally decomposing the fine resin particle in the measurement conditions described below to obtain a TG/DTA curve and analyzing the resulting TG/DTA curve by analysis software attached to the analyzer.

The thermal decomposition initiation temperature of the fine resin particle is measured using a simultaneous thermogravimetry/differential thermal analyzer, "TG/DTA 6200" (manufactured by SII NanoTechnology Inc.). The way of sampling and the temperature conditions were as follows. First, a sample is prepared by filling about 15 mg of a sample with no gaps on the bottom of an aluminum measurement container and measured under an air or nitrogen gas flow rate of 230 mL/min using alumina as a reference substance. For temperature conditions, a TG/DTA curve when the temperature is raised from 30° C. to 500° C. at a temperature ramp rate of 10° C./min is obtained. The resulting curve is analyzed using analysis software attached to the analyzer to obtain a thermal decomposition initiation temperature. A thermal decomposition initiation temperature here means a mass loss initiation temperature disclosed in JIS K 7120:1987, "Testing Methods of Plastics by Thermogravimetry" (8. "How to Read TG Curve") and is a value determined in accordance with this standard.

When the copolymer in the fine resin particle includes the thiol-based compound (F) unit, the fine resin particle contains a sulfur element derived from the thiol-based compound (F). The thiol-based compound content in the fine resin particle is measured by high-frequency inductively coupled plasma (ICP)-atomic emission spectroscopy or fluorescent X-ray analysis.

The sulfur element content is not particularly limited and set as appropriate according to the purposes or applications of the fine resin particle. The sulfur element content in the fine resin particle is preferably 0.05 parts by mass or more and more preferably 0.1 parts by mass or more in relation to 100 parts by mass of the copolymer. The sulfur element content in the fine resin particle is preferably 2 parts by mass or less and more preferably 1 part by mass or less in relation to 100 parts by mass of the copolymer. When the sulfur element content in the fine resin particle is 0.05 parts by mass or more, the thiol-based compound (F) unit is sufficiently included in the fine resin particle, and the heat resistance of the fine resin particle can be increased. When the sulfur element content in the fine resin particle is 2 parts by mass or less, the odor generated from the fine resin particle can be decreased.

The sulfur element content in the fine resin particle is measured by high-frequency inductively coupled plasma (ICP)-atomic emission spectroscopy. Specifically, about 0.5 to 1.0 g of a precisely weighed sample was heated at 450° C. for 3 hours for ashing. The resulting ash and 2 mL of conc. HCl (manufactured by Kanto Chemical Co., Inc., Ultrapur-100, a highly pure reagent) were mixed. Insoluble matters in the mixture were filtrated through an ADAVANTEC No. 7 filter paper, and then the filtrate was diluted to 50 mL with pure water to prepare a test solution. The metal element concentration of the test liquid was measured in the conditions described below. The metal element concentration was calculated from a calibration curve. The metal element amount in a sample was calculated by the following expression.

$$\text{Metal element amount } (\mu g/g) = \text{Metal element concentration } (\mu g/mL) \times 50 \text{ (mL)} / \text{Sample mass (g)}$$

(ICP Measurement Condition)

Measurement device="ICPE-9000", manufactured by Shimadzu Corporation, multitype ICP emission spectrometer Element to be measured: sulfur Observation direction: axis direction High-frequency output: 1.20 kW Carrier flow rate: 0.7 L/min Plasma flow rate: 10.0 L/min Auxiliary flow rate: 0.6 L/min Exposure time: 30 seconds Standard solution for calibration curves: SPEX (U.S.A) "XSTC-13", a 31-element mixture of general-purpose mixed standard solution (base 5% HNO3)—about 10 mg/L each, SPEX (U.S.A) "XSTC-8", a 13-element mixture of general-purpose mixed standard solution (base H2O/trace HF)—about 10 mg/L each (Ashing Condition)

Measurement device: "Muffle furnace STR-15K" electric furnace, manufactured by Isuzu Seisakusho Co., Ltd.

Ashing condition = 450° C × 3 hr (sample amount = about 0.5 to 1.0 g)

The sulfur element content in the fine resin particle by fluorescent X-ray analysis was measured in the following manner.

The S-Kα intensity was measured using an X-ray fluorescence spectrometer, "ZSX Primus IV" (manufactured by Rigaku Corporation), in the conditions described below, and a sulfur element content was measured by an order analysis method using C7H1003 as a balance.

A test sample was prepared in the following matter. That is, a 10-mg portion of a sample was weighed on a carbon sample table (manufactured by Nisshin-EM K.K.), and the sample was adjusted so that it did not spread 10 ramp or wider. After that, the sample was covered with a polypropylene film "Cat No. 3399 G 003" (manufactured by Rigaku Corporation) and set to a sample case for 10 mmφ, which was attached to the spectrometer, to prepare a measurement sample.

<Apparatus Conditions>

Apparatus=X-ray fluorescence spectrometer, "ZSX Primus IV" (manufactured by Rigaku Corporation)

X-ray tube=vertical Rh tube (3.0 KW)

Analysis diameter=10 mmφ

Spin=no spinning

Atmosphere=vacuum

Sample form=metal

Balance component=C7H10O3

Sample film=P.P. Film

Sample weight thickness=set

<Qualitative Elemental Condition>

S-Kα

Bulb=Rh (30 kV-100 mA)

Primary filter=OUT

Attenuator=1/1

Slit=S4

Analyzing crystal=GeH

2θ=110.830 deg (Measurement range: 107 to 115 deg)

PHA=150 to 300

Step=0.05 deg

Time=0.15 sec

The fine resin particle may contain a hindered phenol-based antioxidant. A hindered phenol-based antioxidant has a structure in which a tert-butyl group is bonded to the ortho position of phenol.

Examples of hindered phenol-based antioxidant include pentaerythritol tetrakis[3-(3,5-di-tert-butyl-4-hydroxyphenyl)propionate], octadecyl-3-(3,5-di-tert-butyl-1-hydroxyphenyl)propionate, N,N'-(hexane-1,6-diyl)bis[3-(3,5-di-tert-butyl-4-hydroxyphenyl)propionamide], benzenepropanoic acid, 3,5-bis(1,1-dimethylethyl)-4-hydroxy-C7-C9 side chain alkyl esters, 3,3',3",5,5',5"-hexa-tert-butyl-a,a',a"-(mesitylene-2,4,6-triyl)-tri-p-cresol, calcium diethyl bis[[[3,5-bis(1,1-dimethylethyl)-4-hydroxyphenyl]methyl]phosphonate], ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, reaction products of N-phenyl-benzeneamine and 2,4,4-trimethylbenzene, diethyl [[3,5-bis(1,1-dimethylethyl)-4-hydroxyphenyl]methyl]phosphonate, 2,4-dimethyl-6-(1-methylpentadecyl)phenol, octadecyl-3-(3,5-tert-butyl-4-hydroxyphenyl)propionate, 2',3-bis[[3-[3,5-di-tert-butyl-4-hydroxyphenyl]propionyl]]propionohydrazide, and the like. Hindered phenol-based antioxidants may be used alone or as a combination of two or more thereof.

The hindered phenol-based antioxidant content in the fine resin particle is preferably 0.3 parts by mass or more, more preferably 0.5 parts by mass or more, and more preferably 0.8 parts by mass or more in relation to 100 parts by mass of the copolymer. The hindered phenol-based antioxidant content in the fine resin particle is preferably 5.0 parts by mass or less, more preferably 4.0 parts by mass or less, and more preferably 3.0 parts by mass or less in relation to 100 parts by mass of the copolymer. When the hindered phenol-based antioxidant content is 0.3 parts by mass or more, the heat resistance of the fine resin particle under the nitrogen-air atmosphere can be increased. When the hindered phenol-based antioxidant content is 5.0 parts by mass or less, cleavage of the main and cross-linked chains of the copolymer constituting the fine resin particle can be reduced even under the heating atmosphere, and the brittleness of the fine resin particle can be improved.

Next, methods for producing the fine resin particle will be explained. Methods for producing the fine resin particle are not particularly limited, and the fine resin particle may be produced by polymerizing raw material monomers including the (meth)acrylate-based monomer (A), the alkyl acrylate-based monomer (B), the vinyl monomer (C), and the multifunctional (meth)acrylate-based monomer (D) in a commonly used manner under the presence of an optional polymerization initiator. Raw material monomers may optionally contain the monomer (E) and/or the thiol-based compound (F).

Polymerization methods are not particularly limited, but suspension polymerization is preferred because fine resin particles with a sufficiently large particle diameter can be obtained.

Polymerization initiators are not particularly limited as long as they can initiate the polymerization of raw material monomers. As polymerization initiators, radical polymerization initiators are preferred, and thermal radical polymerization initiators are more preferred. Examples of polymerization initiators include persulfates (for example, ammonium persulfate, potassium persulfate, sodium persulfate, and the like), hydrogen peroxide, organic peroxides, azo compounds, and the like. Specific examples of the polymerization initiators include organic peroxides such as cumene hydroperoxide, di-tert-butyl peroxide, dicumyl peroxide, benzoyl peroxide, lauroyl peroxide, dimethyl bis(tert-butylperoxy)hexane, dimethyl bis(tert-butylperoxy)hexyne-3, bis(tert-butylperoxyisopropyl)benzene, bis(tert-butylperoxy)trimethylcyclohexane, butyl bis(tert-butylperoxy)valerate, tert-butyl peroxy-2-ethylhexanoate, dibenzoyl peroxide, p-menthane hydroperoxide, and tert-butyl peroxybenzoate; nitrile-azo compounds such as 2,2'-azobis(isobutyronitrile), 2,2'-azobis(2-methylbutyronitrile), 2,2'-azobis(2-isopropylbutyronitrile), 2,2'-azobis(2,3-dimethylbutyronitrile), 2,2'-azobis(2,4-dimethylbutyronitrile), 2,2'-azobis(2-methylcapronitrile), 2,2'-azobis(2,3,3-trimethylbutyronitrile), 2,2'-azobis(2,4,4-trimethylvaleronitrile), 2,2'-azobis(2,4-dimethylvaleronitrile), 2,2'-azobis(4-methoxy-2,4-dimethylvaleronitrile), 2,2'-azobis(4-ethoxy-2,4-dimethylvaleronitrile), 2,2'-azobis(4-n-butoxy-2,4-dimethylvaleronitrile), 1,1'-azobis(cyclohexane-1-carbonitrile), 2-(carbamoylazo)isobutyronitrile, and 4,4'-azobis(4-cyanopentanoic acid); and the like. The polymerization initiators may be used alone or as a combination of two or more thereof.

The amount of the polymerization initiator used is preferably 0.1 to 3 parts by mass and more preferably 0.2 to 1.0 parts by mass in relation to 100 parts by mass of raw materials because polymerization of the raw material monomers can be smoothly initiated.

The fine resin particle can be produced by polymerizing raw material monomers in a polymerization medium (an aqueous medium or organic medium) under the presence of a polymerization initiator. It is preferred to produce the fine resin particle by suspension polymerization of raw material monomers in an aqueous medium under the presence of a polymerization initiator. It is preferred to perform suspension polymerization by dispersing droplets of a raw material mixture (oily phase) containing raw material monomers and a polymerization initiator in an aqueous medium (aqueous phase) to obtain a dispersion and polymerizing the raw material monomers in this dispersion.

Aqueous media are not particularly limited, and examples thereof include water, water-soluble organic media (lower alcohols (alcohols with 5 or fewer carbon atoms) such as methanol, ethanol, and isopropyl alcohol), mixed media of water and a water-soluble organic medium, and the like, and the aqueous media preferably contain water. The amount of the aqueous media used is preferably 100 to 2,000 parts by mass and preferably 200 to 1,000 parts by mass in relation to 100 parts by mass of raw material monomers. By adjusting the amount of aqueous media used to be within the above range, the dispersion stability of monomers or the like during polymerization can be increased, and the occurrence of agglomerates of fine resin particles during polymerization can be suppressed.

Organic media are not particularly limited, and examples thereof include toluene, benzene, ethyl acetate, and the like.

The aqueous media may contain a dispersion stabilizer. Examples of dispersion stabilizers include phosphate salts such as calcium phosphate, magnesium phosphate, aluminum phosphate, and zinc phosphate; pyrophosphate salts such as calcium pyrophosphate, magnesium pyrophosphate, aluminum pyrophosphate, and zinc pyrophosphate; poorly water-soluble inorganic compounds such as calcium carbonate, magnesium carbonate, magnesium oxide, colloidal silica, calcium hydroxide, magnesium hydroxide, aluminum hydroxide, calcium metasilicate, calcium sulfate, barium sulfate, and colloidal silica; water-soluble polymers such as polyvinylpyrrolidone, partially hydrolyzed polyvinyl alcohol, poly(acrylic acid), carboxymethyl cellulose, and methyl cellulose; and the like. Among these, it is preferred to use dispersion stabilizers capable of being decomposed by acid and dissolved in water (for example, calcium carbonate, tribasic calcium phosphate, magnesium hydroxide, magnesium pyrophosphate, and calcium pyrophosphate) because such dispersion stabilizers can be easily removed after the polymerization step. The dispersion stabilizer may be used alone or as a combination of two or more thereof.

The amount of dispersion stabilizers used is preferably 0.1 to 20 parts by mass and more preferably 0.5 to 10 parts by mass in relation to 100 parts by mass of the raw material monomers because the dispersibility of droplets of a raw material mixture in the suspension is excellent while ensuring the flowability of suspension.

In order to further stabilize the suspension (reaction liquid) during the suspension polymerization, the aqueous media may contain a surfactant. The surfactant may be any of an anionic surfactant, a cationic surfactant, a non-ionic surfactant, and a zwitterionic surfactant. As the surfactant, a reactive surfactant capable of reacting with raw material monomers is preferably used. When a reactive surfactant is used, the surfactant can remain on the surface of the resulting fine resin particles, and when the resin composition described below contains the aqueous media described above, the fine resin particles can be dispersed uniformly in the synthetic resin without agglomeration. The surfactants may be used alone or as a combination of two or more thereof.

Examples of anionic surfactants include sodium oleate; fatty acid soaps such as castor oil potassium soap; alkyl sulfate ester salts such as sodium lauryl sulfate and ammonium lauryl sulfate; alkyl benzene sulfonate salts such as sodium dodecylbenzenesulfonate; alkylnaphthalenesulfonate salts; alkanesulfonic acid salts; dialkyl sulfosuccinate salts; alkyl phosphate ester salts; naphthalenesulfonic acid, polymer with formaldehyde; polyoxyethylene alkyl phenyl ether sulfate ester salts; polyoxyethylene sulfonated phenyl ether phosphate; polyoxyethylene alkyl sulfate ester salts; and the like.

As the anionic reactive surfactant, commercially available anionic reactive surfactants may be used. Examples of anionic reactive surfactants include AQUALON (registered trademark) KH-10, KH-1025, KH-05, HS-10, HS-1025, BC-0515, BC-10, BC-1025, BC-20, BC-2020, AR-1025, and AR-2025, manufactured by DKS CO. Ltd.; LATEMUL (registered trademark) S-120, S-180A, S-180, and PD-104, manufactured by Kao Corporation; ADEKA REASOAP (registered trademark) SR-1025 and SE-10N, manufactured by ADEKA Corporation; and KAYAMER PM-2 and KAYAMER PM-21 (registered trademark), manufactured by Nippon Kayaku Co., Ltd.; and the like.

Examples of cationic surfactants include alkyl amine salts such as laurylamine acetate and stearylamine acetate; quaternary ammonium salts such as lauryltrimethyl ammonium chloride; and the like.

Examples of nonionic surfactants include (meth)acrylate sulfate ester-based surfactants (examples of commercially available products include RMA-564, RMA-568, RMA-1114, and the like, manufactured by Nippon Nyukazai Co., Ltd.); polyoxyalkylene branched decyl ether, polyoxyethylene tridecyl ether, polyoxyalkylene alkyl ether, polyoxyalkylene tridecyl ether, polyoxyethylene isodecyl ether, polyoxyalkylene lauryl ether, polyoxyalkylene alkyl ether, polyether polyol, polyoxyethylene styrenated phenyl ether, polyoxyethylene naphthyl ether, polyoxyethylene phenyl ether, polyoxyethylene polyoxypropylene glycol, polyoxyethylene lauryl ether, polyoxyethylene oleyl/cetyl ether, polyoxyethylene glyceryl isostearate, polyoxyethylene alkyl ether, polyoxyethylene alkyl phenyl ether, polyoxyethylene fatty acid ester, sorbitan fatty acid ester, polyoxy sorbitan fatty acid ester, polyoxyethylene alkyl amine, glycerin fatty acid ester, oxyethylene-oxypropylene block polymers, and the like.

As the nonionic reactive surfactant, commercially available nonionic reactive surfactants may be used. Examples of nonionic reactive surfactants include alkyl ether-based surfactants (examples of commercially available products include ADEKA REASOAP ER-10, ER-20, ER-30, ER-40, manufactured by ADEKA Corporation; LATEMUL PD-420, PD-430, and PD-450, manufactured by Kao Corporation; and other surfactants); and alkyl phenyl ether or alkyl phenyl ester-based surfactants (examples of commercially available products include AQUALON RN-10, RN-20, RN-30, RN-50, AN-10, AN-20, AN-30, and AN-5065, manufactured by DKS CO. Ltd.; ADEKA REASOAP NE-10, NE-20, NE-30, and NE-40, manufactured by ADEKA Corporation; and the like).

Examples of zwitterionic surfactants include lauryldimethylamine oxide, phosphate ester-based surfactants, phosphite ester-based surfactants, and the like.

The amount of the surfactant used is preferably 0.001 to 5 parts by mass, more preferably 0.005 to 3 parts by mass, and more preferably 0.01 to 1 part by mass in relation to 100 parts by mass of raw material monomers.

The fine resin particle may be obtained through washing, drying, crushing, classification, and the like, according to need, after polymerization. Specifically, polymerization media are separated and reduced from a reaction liquid containing the fine resin particle obtained by a polymerization reaction to prepare a cake containing the fine resin particle. Methods for separating and reducing a polymerization medium from reaction liquid are not particularly limited, and examples thereof include a method for separating a polymerization medium from reaction liquid to reduce the polymerization medium by suction filtration, centrifugation, pressurized separation, and the like.

Next, the cake is washed with an aqueous medium and/or an organic solvent and then dried according to need to obtain the fine resin particle. The washing methods of the fine resin particle are not particularly limited and may be a method including supplying a cake into a centrifugal separator, then supplying an aqueous medium to the cake to wash the fine resin particle, and removing the aqueous medium after the washing by centrifugation, and the like. It should be noted that when the reactive surfactant is used, the washing step of the cake with an aqueous medium may be omitted.

In order to prevent the coalescence of the fine resin particles during drying of the fine resin particles, an anti-blocking agent may be attached to the surface of the fine resin particles. Anti-blocking agents are not particularly limited, and examples thereof include fine inorganic powder such as fine silica particles, fine alumina particles, fine titania particles, fine zirconia particles, fine ceria particles, fine iron oxide particles, and fine zinc oxide particles.

The resulting fine resin particle may optionally be crushed or classified. Grinding mills used for the disintegration of fine resin particles are not particularly limited, and examples thereof include dry grinding mills such as mechanical grinding mills (for example, blade mills, super rotors) and airflow grinding mills [for example, nano grinding mills (jet mills)], wet mills such as bead mills, ball mills, and hammer mills, and the like.

Classification methods of fine resin particles are not particularly limited, and, for example, wind power classification, screen classification, and the like may be mentioned. Wind power classification means a method for classifying fine resin particles using airflow. Screen classification means a method including supplying fine resin particles on a screen and then vibrating the screen to classify the fine resin particles on the screen into particles passing the mesh of the screen and particles not passing the mesh of the screen.

The fine resin particle has excellent softness and improved brittleness because the fine resin particle contains a copolymer with specific monomer units. Accordingly, the fine resin particle can be used in various applications. The fine resin particle can be suitably used as a light diffuser, a coating film-softening agent, and a matting agent for paint compositions. A coating film-softening agent is an additive for softening the coating film and imparting elasticity to the coating film.

The fine resin particle can be used as a stress reliever. The fine resin particle can be suitably used as a stress reliever for curable resins. When an adhesive contains the fine resin particle, softness is imparted to a hardened adhesive, and an excellent relaxation effect against the exterior stress is exhibited. The fine resin particle can be used as a light diffuser. A coating film or a synthetic resin-made molded body containing the fine resin particle can impart light diffusion properties to the coating film or the synthetic resin-made molded body.

[Resin Composition]

The fine resin particle may be mixed with a synthetic resin to constitute a resin composition. The synthetic resin may be any of an ionizing radiation-curable resin such as a UV-curable resin and an electron beam-curable resin, a thermoplastic resin, or a thermosetting resin. Synthetic resins may be used alone or as a combination of two or more thereof.

Examples of thermoplastic resins include (meth)acrylic resins, alkyd resins, polycarbonate, polyester-based resins, polyolefin-based resins (for example, polyethylene-based resins, polypropylene-based resins, chlorinated polyolefin-based resins, amorphous polyolefin-based resins, etc.), polystyrene-based resins, (meth)acrylic-urethane-based resin, urethane-based resins, polyvinyl chloride-based resins, polyvinylidene chloride-based resins, melamine-based resins, styrene-based resins, alkyd-based resins, phenolic resins, epoxy-based resins, polyester-based resins, silicone-based resins (alkylpolysiloxane-based resins, etc.), modified silicone resins [(meth)acrylic-silicone-based resins, silicone-alkyd-based resins, silicone-urethane-based resins, silicone-polyester resins, and the like], fluorine-containing resins (polyvinylidene fluoride, fluoroolefin vinyl ether polymer, etc.), and the like. Acrylic resins, polycarbonate, polyester resins, and polystyrene-based resins are preferred due to their excellent transparency. Thermoplastic resins may be used alone or as a combination of two or more thereof. Here, (meth)acryl means acryl or methacryl.

In the present description, the “synthetic resin” is a concept encompassing monomers, which serve as raw materials of synthetic resins and oligomers formed by polymerization of these monomers, unless otherwise stated. Accordingly, the resin composition may contain a monomer, which serves as a raw material of a synthetic resin, or an oligomer formed by polymerizing this monomer.

Examples of thermosetting resins include thermosetting urethane resins composed of acrylic polyol and an isocyanate prepolymer, phenolic resins, urea melamine resins, epoxy resins, unsaturated polyester resins, silicone resins, and the like.

Examples of ionizing radiation-curable resins include multifunctional (meth)acrylate resins such as polyhydric alcohol multifunctional (meth)acrylates; multifunctional urethane acrylate resins synthesized from diisocyanates, polyhydric alcohols, and (meth)acrylic acid esters with hydroxy groups; and the like. As ionizing radiation-curable resins, multifunctional (meth)acrylate resins are preferred, and polyhydric alcohol multifunctional (meth)acrylate resins with 3 or more (meth)acryloyl groups in one molecule are more preferred. Specific examples of polyhydric alcohol multifunctional (meth)acrylate resins with 3 or more (meth) acryloyl groups in one molecule include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth) acrylate, dipentaerythritol triacrylate, dipentaerythritol pentaacrylate, dipentaerythritol tetra(meth)acrylate, dipentaerythritol hexa(meth)acrylate, tripentaerythritol triacrylate, tripentaerythritol hexaacrylate, and the like. Ionizing radiation curable resins may be used alone or as a combination of two or more thereof.

Besides the ionizing radiation-curable resins mentioned above, examples of ionizing radiation-curable resins include polyether resins with an acrylate-based functional group, polyester resins with an acrylate-based functional group, epoxy resins with an acrylate-based functional group, alkyd resins with an acrylate-based functional group, spiroacetal resins with an acrylate-based functional group, polybutadiene resins with an acrylate-based functional group, polythiol polyene resins with an acrylate-based functional group, and the like.

When a UV-curable resin is used among the ionizing radiation-curable resins, a photopolymerization initiator is added to the UV-curable resin to prepare a synthetic resin. Photopolymerization initiators are not particularly limited. Examples of photopolymerization initiators include acetophenones, benzoins, benzophenones, phosphine oxides, ketals, α-hydroxyalkylphenones, α-aminoalkylphenones, anthraquinones, thioxanthones, azo compounds, peroxides (described in Japanese Patent Application Publication No. 2001-139663, etc.), 2,3-dialkyldione compounds, disulfide compounds, fluoroamine compounds, aromatic sulfoniums, onium salts, borate salts, active halogen compounds, α-acyloxime ester, and the like.

Examples of the acetophenones described above include acetophenone, 2,2-diethoxyacetophenone, p-dimethylacetophenone, 1-hydroxydimethylphenylketone, 1-hydroxycyclohexylphenylketone, 2-methyl-4-methylthio-2-morpholinopropiophenone, 2-benzyl-2-dimethylamino-1-(4-morpholinophenyl)-butanone, and the like. Examples of benzoins include benzoin, benzoin benzoate, benzoin benzene sulfonic acid ester, benzoin toluene sulfonic acid ester, benzoin methyl ether, benzoin ethyl ether, benzoin isopropyl ether, and the like. Examples of benzophenones include benzophenone, 2,4-dichlorobenzophenone, 4,4-dichlorobenzophenone, p-chlorobenzophenone, and the like. Examples of phosphine oxides include (2,4,6-trimethylbenzoyl)diphenylphosphine oxide and the like. Examples of ketals include benzyl methyl ketals such as 2,2-dimethoxy-1,2-diphenylethan-1-one, and the like. Examples of α-hydroxy-alkylphenones include 1-hydroxycyclohexyl phenyl ketone and the like. Examples of α-aminoalkylphenones include 2-methyl-1-[4-(methylthio)phenyl]-2-(4-morpholinyl)-1-propanone and the like.

Preferable examples of commercially available photoradical polymerization initiators include the product name "Irgacure (registered trademark) 651" (2,2-dimethoxy-1,2-diphenylethan-1-one), manufactured by BASF Japan, the product name "Irgacure (registered trademark) 184", manufactured by BASF Japan, the product name "Irgacure (registered trademark) 907" (2-methyl-1-(4-methylthiophenyl)-2-morpholinopropan-1-one), manufactured by BASF Japan, and the like.

The amount of the photopolymerization initiator used is preferably 0.5 to 20 parts by mass, more preferably 1 to 10 parts by mass, and more preferably 1.5 to 8 parts by mass in relation to 100 parts by mass of UV-curable resins.

The resin composition preferably contains a solvent for adjusting the viscosity of the resin composition. Solvents are not particularly limited, and examples thereof include water, organic solvents, and the like. Organic solvents are not particularly limited, and examples thereof include monohydric alcohols such as methanol, ethanol, n-propanol, isopropanol, n-butanol, isobutanol, and tert-butanol; polyhydric alcohols such as ethylene glycol, propylene glycol, butylene glycol, and propylene glycol monomethyl ether; ethers of polyhydric alcohols such as dioxane, ethylene glycol diethyl ether, ethylene glycol monobutyl ether, ethylene glycol monoethyl ether, and ethylene glycol monobutyl ether; ketone solvents such as acetone, methyl ethyl ketone, methyl isobutyl ketone, cyclohexanone, and cyclopentanone; esters such as ethyl acetate and butyl acetate; toluene, xylene, benzene, and the like. Solvents may be used alone or as a combination of two or more thereof.

The solvent content in the resin composition is adjusted as appropriate according to the applications and preferably 20 to 60% by mass.

The fine resin particle content in the fine resin particle composition is adjusted as appropriate according to the applications. The fine resin particle content in the fine resin composition is preferably 100 parts by mass or more, more preferably 110 parts by mass or more, more preferably 120 parts by mass or more, more preferably 140 parts by mass or more, and more preferably 150 parts by mass or more in relation to 100 parts by mass of synthetic resins. The fine resin particle content in the fine resin composition is preferably 1,900 mass by mass or less, more preferably 900 parts by mass or less, and more preferably 400 parts by mass or less in relation to 100 parts by mass of synthetic resins. When the fine resin particle content is 100 parts by mass or more, excellent softness or matting effect can be imparted to a coating film obtained from the resin composition used as a paint composition. When the fine resin particle content is 1,900 parts by mass or less, the dispersibility of the fine resin particle is increased. Thus, when the fine resin composition is used as a paint composition, the resulting coating film has an excellent appearance with no microcracks and roughness.

The resin composition may contain a pigment. Examples of pigments include inorganic pigments such as titanium oxide, calcium carbonate, aluminum powder, copper powder, mica powder, iron oxide, and carbon black; and organic pigments such as phthalocyanine blue, phthalocyanine green, dioxazine violet, toluidine red, perylene, quinacridone, and benzidine yellow. Pigments may be used alone or as a combination of two or more thereof.

The resin composition may contain other additives such as coating surface conditioners, fluidity modifiers, viscosity modifiers, defoaming agents, curing catalysts, light stabilizers, weather stabilizers, heat stabilizers, UV absorbers, antioxidants, leveling agents, and pigment dispersants within the range that does not impair the physical properties of the resin composition.

The resin composition is preferably used as a paint composition. When the resin composition is used as a paint composition, a synthetic resin acts as a binder. A coating film can be formed by coating the resin composition on any coating surface of a substrate or the like to prepare a coating film, drying this coating film, and, if necessary, curing the coating film. As methods for coating the resin composition on a coating surface, known methods such as reverse roll coating methods, gravure coating methods, die coating methods, comma coating methods, spray coating methods, brush coating methods, bar coating methods, blade coating methods, spin coating methods, reverse coating methods, roll coating methods, micro-gravure coating methods, lip coating methods, air knife coating methods, and dipping coating methods may be used.

When the synthetic resin in the resin composition is an ionization radiation-curable resin, the resin composition may be coated, the solvent may be dried if necessary, and the resin composition may be irradiated with active energy rays to cure the ionization radiation-curable resin.

Examples of active energy rays include UV rays emitted from light sources such as xenon lamps, low-pressure mercury lamps, high-pressure mercury lamps, ultra-high-pressure mercury lamps, metal halide lamps, carbon arc lamps, and tungsten lamps; and electron rays, α-rays, β-rays, γ-rays, and the like, extracted from electron accelerators of the Cockcroft-Walton type, Van de Graaff type, resonant transformer type, insulated core transformer type, linear type, Dynamitron type, or high-frequency type electron accelerators, etc., which are normally 20 to 2,000 KeV, may be used.

The fine resin particle in a coating film formed from a paint composition is less likely to collapse or crack due to stress (for example, pressing force, etc.) applied to the coating film. Furthermore, since the fine resin particle maintains excellent softness, the fine resin particle absorbs stress applied to the coating film smoothly. Accordingly, the coating film can maintain the desired softness (elasticity) stably over a long period of time and absorbs applied stress smoothly, which generally prevents unexpected problems such as buckling on the surface of the coating film.

In addition, by forming uneven portions on the coating film surface by the fine resin particles included in the paint composition, a matting effect can be imparted to the coating film. Since the fine resin particle absorbs stress applied to a coating film smoothly and has improved brittleness, as described above, the uneven portion formed on the surface of the coating film never deforms due to the stress applied from the exterior, and the matting effect of the coating film is maintained stably over a long period of time, and a problem in that the matting effect becomes non-uniform can be generally prevented.

Furthermore, the fine resin particle has excellent oil resistance, and the absorption of oily components is reduced. Thus, even in a state where the fine resin particle is mixed with a synthetic resin, deterioration of the fine resin particle due to absorption of the synthetic resin by the fine resin particle is suppressed, and excellent softness and excellent stress relaxation effect against the external stress are exhibited. Furthermore, the resulting coating film maintains excellent characteristics stably over a long period of time.

Then, the fine resin particle has reduced residual monomer amounts due to the combination of specific monomer units. Furthermore, due to the oil absorption resistance of the fine resin particle, the elution of monomers remaining in the fine resin particle out of the fine resin particle is suppressed, and discoloration of the coating film caused by the elution of the remaining monomers into the synthetic resin can be prevented.

The substrate on which the resin composition is coated to form a coating film is not particularly limited. Examples of materials of substrates include cement, tiles, metals, synthetic resins, glass, and the like. Synthetic resins used for substrates are not particularly limited, and examples thereof include polyester resins such as polyethylene terephthalate, triacetyl cellulose resins, polystyrene resins, acrylic resins, polycarbonate resins, cycloolefin-based resins, and the like.

When the substrate is a film, a transparent film is preferred. Examples of materials constituting a transparent film include polyester resins such as polyethylene terephthalate (PET) and polyethylene naphthalate; cellulose resins such as diacetyl cellulose and triacetyl cellulose (TAC); polycarbonate resins, (meth)acrylic resins (such as polymethyl methacrylate), styrene resins (polystyrene, acrylonitrile-styrene copolymers, and the like), polyolefin resins (polyethylene, polypropylene, polyolefin-based resins with cyclic or norbornene structures, and ethylene-propylene copolymers), vinyl chloride-based resins, amide resins (nylon, aromatic polyamide, and the like), imide resins, sulfone-based resins, polyethersulfone-based resins, polyether ether ketone-based resins, polyphenyl sulfide-based resins, vinyl alcohol-based resins, vinylidene chloride-based resins, vinylbutyral-based resins, acrylate-based resins, polyoxymethylene-based resins, epoxy-based resins, and the like. A material with low birefringence is particularly preferred as a material constituting the film. The materials constituting a transparent film may be used alone or as a combination of two or more thereof.

The thickness of the film is adjusted as appropriate. Generally, the film thickness is preferably 10 to 500 μm, more preferably 20 to 300 μm, and more preferably 30 to 200 μm in view of workabilities such as strength or handleability, thinness, and other properties.

An additive may be added to the film. The additive may be, for example, a UV absorber, an infrared absorber, an antistatic agent, a refractive index modifier, an enhancer, and the like.

An optical film can be constituted by using a film as a substrate and forming a coating film on this film in the manner described above. The optical film may be suitably used as a light diffusion film or an antiglare film.

When an optical film is produced using a resin composition, synthetic resins used in the resin composition are not particularly limited as long as the synthetic resins are used in the related field according to the required characteristics (for example, transparency, dispersibility of fine resin particles, light resistance, moisture resistance, heat resistance, and the like).

In view of increasing the durability of the coating film, synthetic resins are preferably curable resins that can form crosslinked structures by the crosslinking reaction. The curable resin described above can be cured in various curing conditions. The curable resins are classified into ionization radiation-curable resins such as UV-curable resins and electron ray-curable resins, thermosetting resins, warm-air-curable resins, or the like, depending on the curing types.

When an optical film is prepared, the fine resin particle content in the resin composition is preferably 10 to 300 parts by weight in relation to 100 parts by weight of synthetic resins.

In the case of an optical film, the thickness of the coating film is not particularly limited. The thickness of the coating film is determined as appropriate depending on the particle diameter of the fine resin particle and is preferably 1 to 50 μm and more preferably 3 to 30 μm.

In the above, the case where the resin composition is used for producing an optical film has been described, but the resin composition may also be used for other applications. When the resin composition is used in other applications, the resin composition may contain known coating surface conditioners, fluidity modifiers, UV absorbers, light stabilizers, curing catalysts, extender pigments, coloring pigments, metal pigments, mica powder pigments, dyes, or the like according to need.

Fine resin particles can be included in resin molded bodies. A resin molded body is a molded body of a resin composition containing the fine resin particle and a synthetic resin. The fine resin particles can function as light diffusers in a resin molded body by using the resin composition as a light diffusing resin composition. The resin molded body functions as a light diffuser, such as a light diffusing plate, and can be used as a LED illumination cover and the like.

Synthetic resins constituting the resin molded body are preferably transparent. Examples of transparent synthetic resins include (meth)acrylic resins, polycarbonate resins, polystyrene resins, (meth)acrylic-styrene resins [a copolymer of (meth)acrylic acid ester and styrene], and the like. It should be noted that a (meth)acrylic acid ester means an acrylic acid ester or a methacrylic acid ester.

The fine resin particle content in the resin molded body is preferably 0.01 to 5 parts by weight and more preferably 0.1 to 5 parts by weight in relation to 100 parts by weight of synthetic resins constituting the resin molded body. The resin composition may contain an additive such as a UV absorber, an antioxidant, a heat stabilizer, a light stabilizer, or a fluorescent brightener.

The thickness, shape, and other characteristics of a resin molded body can be selected as appropriate depending on the applications of the resin molded body.

The resin molded body can be obtained by supplying a resin composition into an extruder (a single screw extruder, a twin screw extruder, or the like) and melt-kneading the resin composition. The resin composition obtained by melt-kneading may be shaped into a plate-like shape through a T-die and a roll unit to produce a resin molded body. Alternatively, the resin composition obtained by melt-kneading may be pelletized, and the pellets are then molded by injection molding, press molding, or the like to produce a plate-shaped resin molded body.

Since the resin molded body is a molded body of a molding resin composition containing the fine resin particle of the present invention with excellent uniform dispersibility, a resin molded body with uniform optical properties (light diffusivity, anti-glare properties, light transmittance, and the like) with no unevenness can be obtained.

Advantageous Effects of Invention

The fine resin particle of the present invention has excellent softness and improved brittleness and, therefore, can be suitably used in various applications.

The composition containing the fine resin particle of the present invention can be suitably used as a paint composition. A coating film formed from the paint composition can maintain excellent softness (elasticity) and appearance stably over a long period of time.

DESCRIPTION OF EMBODIMENTS

Figure 1:
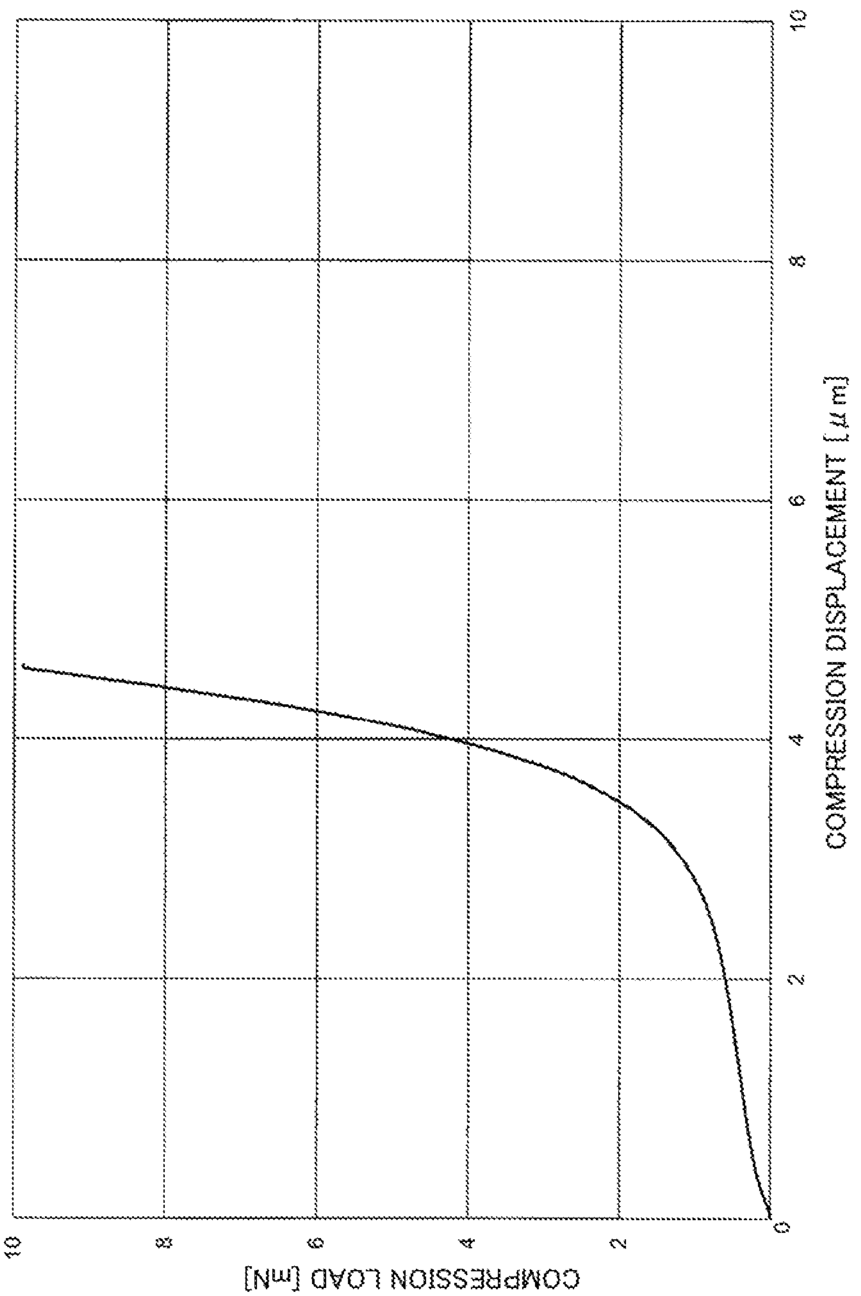
FIG. 1 is a compressive displacement-compressive load curve according to the fine resin particle of Example 1.

The invention will be described in further detail below with reference to Examples, but the invention is not limited to these Examples.

EXAMPLES

In the Examples and Comparative Examples, the compounds below were used.

[Alkyl (meth)acrylate (A)]

Alkyl methacrylate with a tridecyl group (carbon number: 13) as an alkyl group (C13.0-MA, manufactured by Evonik Industries AG, product name "VISIOMER Terra (registered trademark) C13.0-MA", the glass transition temperature Tg of the homopolymer: −46° C., biomass degree: 76%)

A mixture (C17.4-MA, manufactured by Evonik Industries AG, product name "VISIOMER Terra (registered trademark) C17.4-MA", the glass transition temperature Tg of the homopolymer: −22° C., biomass degree: 81%) of alkyl methacrylate with a hexadecyl group (carbon number: 16) as an alkyl group, alkyl methacrylate with a stearyl group (octadecyl group, carbon number: 18) as an alkyl group, and alkyl methacrylate with an eicosyl group (carbon number: 20) as an alkyl group

[Alkyl acrylate-Based Monomer (B)]

Methyl acrylate (MA, the glass transition temperature Tg of the homopolymer: 8° C.)

Butyl acrylate (BA, the glass transition temperature Tg of the homopolymer: −55° C.)

[Vinyl Monomer (C)]

Methyl methacrylate (MMA, the glass transition temperature Tg of the homopolymer: 105° C.)

Styrene (St, the glass transition temperature Tg of the homopolymer: 100° C.)

[Multifunctional (meth)acrylate-Based Monomer (D)]

Ethylene glycol dimethacrylate (EGDMA)

[Thiol-Based Compound (F)]

Pentaerythritol tetrakis(thioglycolate) (PETG)

[Antioxidant]

Hindered phenolic antioxidant (manufactured by BASF Japan, product name "Irganox (registered trademark) 1010")

[Surfactant]

Caprolactone EO modified phosphate dimethacrylate (KAYAMER PM-21, manufactured by Nippon Kayaku Co., Ltd., product name "KAYAMER (registered trademark) PM-21")

[Polymerization Initiator]

2,2'-Azobis(2,4-dimethylvaleronitrile) (ABN-V)

Benzoyl peroxide (BPO)

Examples 1 to 7 and Comparative Examples 1 to 4

In a polymerization vessel equipped with a stirrer, a thermometer, and a cooling mechanism, 400 parts by mass of deionized water and 2.5 parts by mass of magnesium pyrophosphate as a dispersion stabilizer were supplied to prepare an aqueous phase.

Raw material monomers including the given amounts listed in Table 2 of the alkyl (meth)acrylate-based monomer (A), the alkyl acrylate-based monomer (B), the vinyl monomer (C), the multifunctional (meth)acrylate-based monomer (D), and the thiol-based compound (F), a surfactant, a hindered phenolic antioxidant, and a polymerization initiator were mixed homogeneously to prepare a raw material mixture (an oily phase).

The oily phase was supplied to the aqueous phase in the polymerization vessel, and the resulting mixture was stirred for 10 minutes at a rotation speed of 8,000 rpm to disperse the droplets of the oily phase in the aqueous phase, thereby preparing a dispersion. The inside of the polymerization vessel was replaced with nitrogen gas, and then the dispersion was heated to 55° C. The raw material monomer was polymerized over 2 hours while stirring the dispersion at 55° C.

In the polymerization reaction described above, two hours after the exothermic peak was checked, the dispersion was heated to 100° C. and kept for 3 hours to polymerize to obtain a copolymer. After that, a slurry (reaction liquid) containing fine resin particles, including the copolymer, was obtained by cooling the dispersion.

Hydrochloric acid was added to the resulting slurry to decompose magnesium pyrophosphate, and then suction filtration was performed to separate and reduce water to prepare a cake containing fine resin particles. The cake was washed with water multiple times. Fine silica particles as anti-blocking agents were supplied to the cake, and the cake was dried in a vacuum oven at 60° C. to obtain fine resin particles.

Regarding the resulting fine resin particles, the biomass degree of the copolymer was measured in the manner described above, and the results thereof are shown in Table 2.

Regarding the copolymer constituting the resulting fine resin particle, the content of alkyl (meth)acrylate-based monomer units having C1-3 alkyl groups in relation to 100 parts by mass of the total of the alkyl (meth)acrylate-based monomer units is listed in the column of the "Alkyl (meth) acrylate-based monomer (C1-3) unit" in Table 2.

Regarding the copolymer constituting the resulting fine resin particle, the mass ratios of the content of the vinyl monomer (C) unit having a homopolymer glass transition temperature Tg of 70° C. or higher and one polymerizable unsaturated bond to the content of the multifunctional (meth)acrylate monomer (D) unit [vinyl monomer (C) unit content/multifunctional (meth)acrylate-based monomer (D) unit content] are listed in the column of [(C)/(D)] of Table 2.

The compressive strength at 10% compressive strength (S10 strength), volume average particle diameter and coefficient of variation (CV value) of the primary particles, and the total amount of residual monomers in relation to the total mass of the fine resin particles were measured in the manner described above for the obtained resin particles, and the results are shown in Table 2. The fine resin particles of Examples 2 to 7 were below the measurement limit. In Table 1, "below the measurement limit" is expressed as "-".

Figure 2:
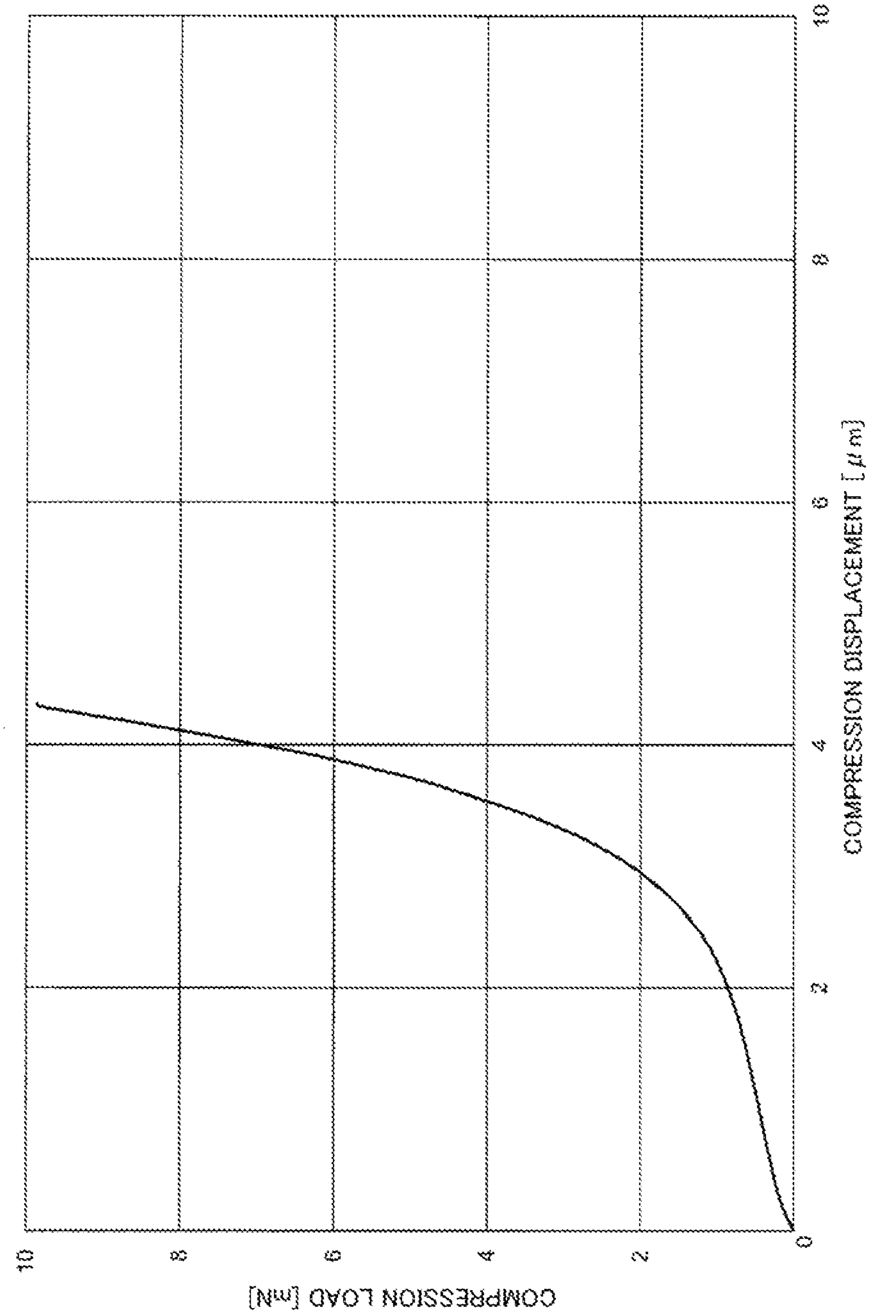
FIG. 2 is a compressive displacement-compressive load curve according to the fine resin particle of Example 2.
Figure 3:
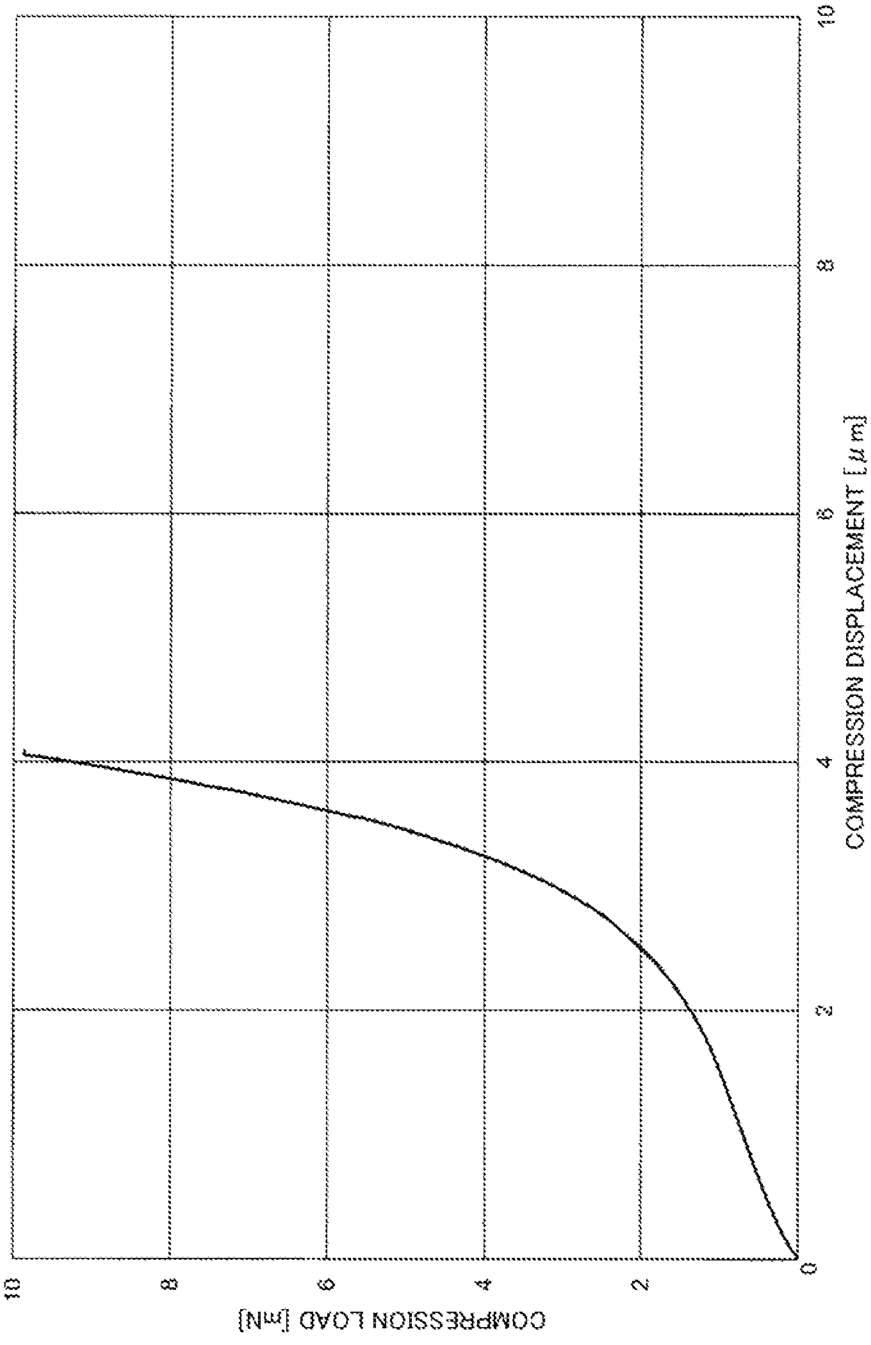
FIG. 3 is a compressive displacement-compressive load curve according to the fine resin particle of Example 3.
Figure 4:
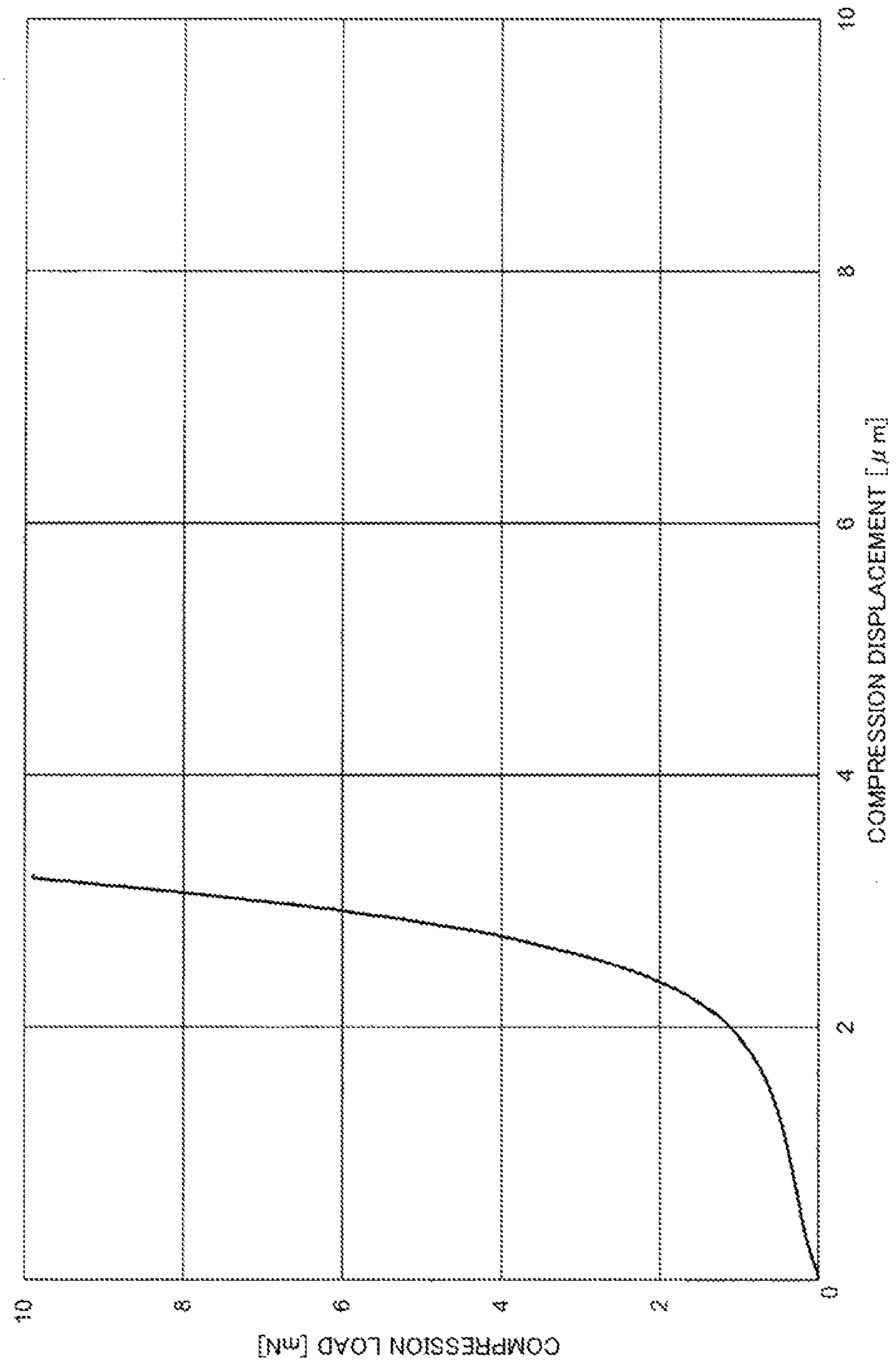
FIG. 4 is a compressive displacement-compressive load curve according to the fine resin particle of Example 4.
Figure 5:
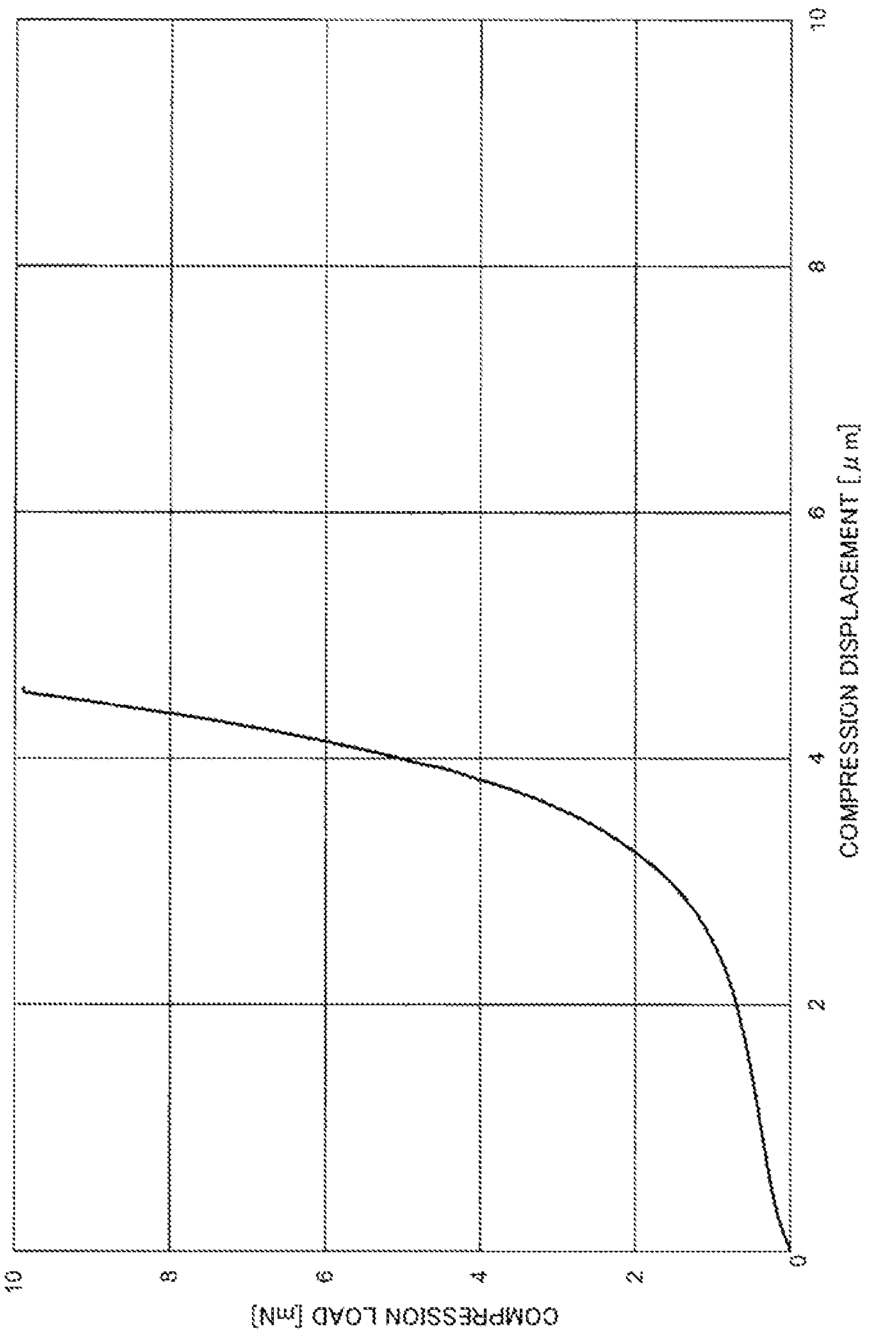
FIG. 5 is a compressive displacement-compressive load curve according to the fine resin particle of Example 5.
Figure 6:
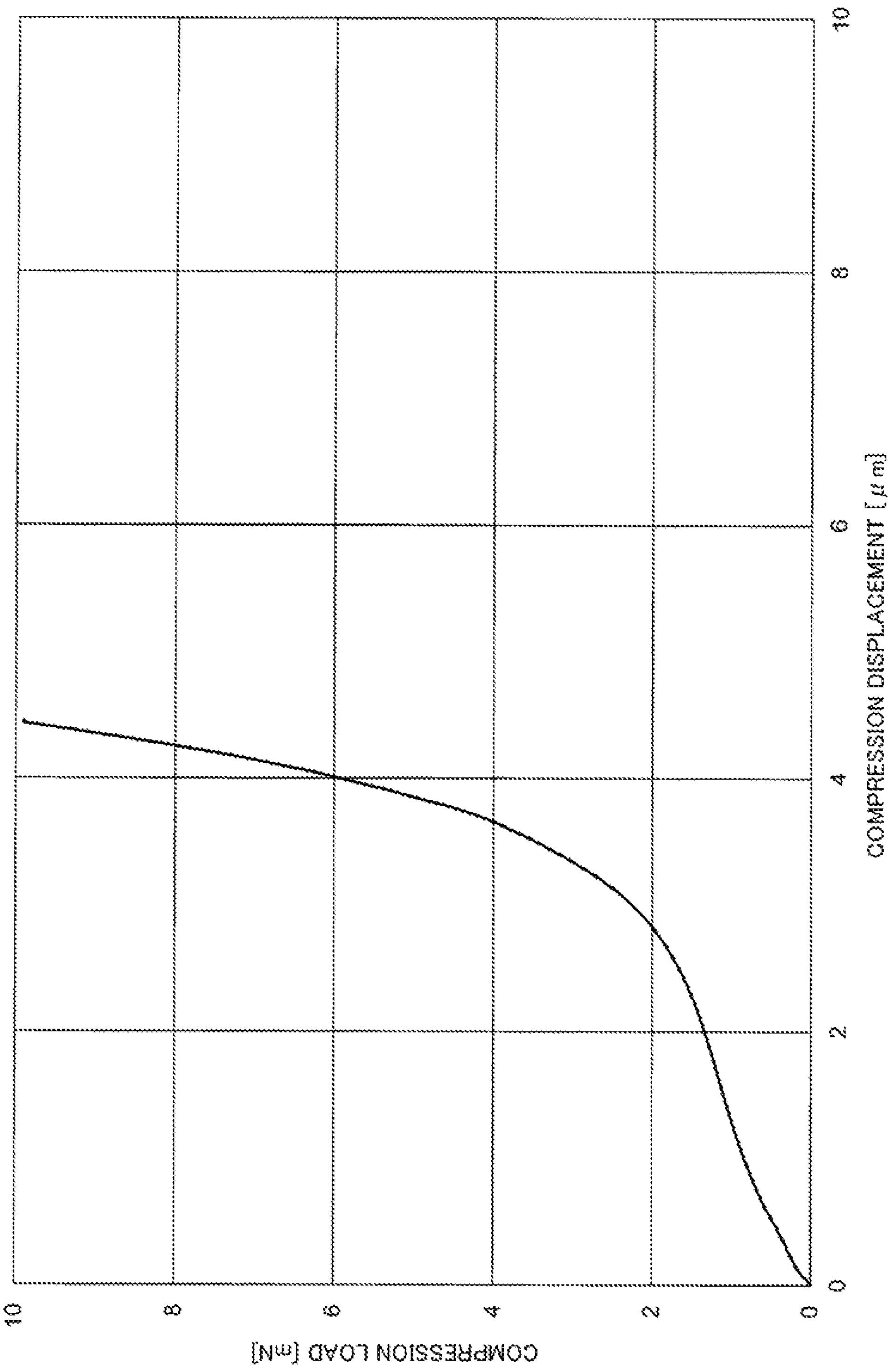
FIG. 6 is a compressive displacement-compressive load curve according to the fine resin particle of Example 6.
Figure 7:
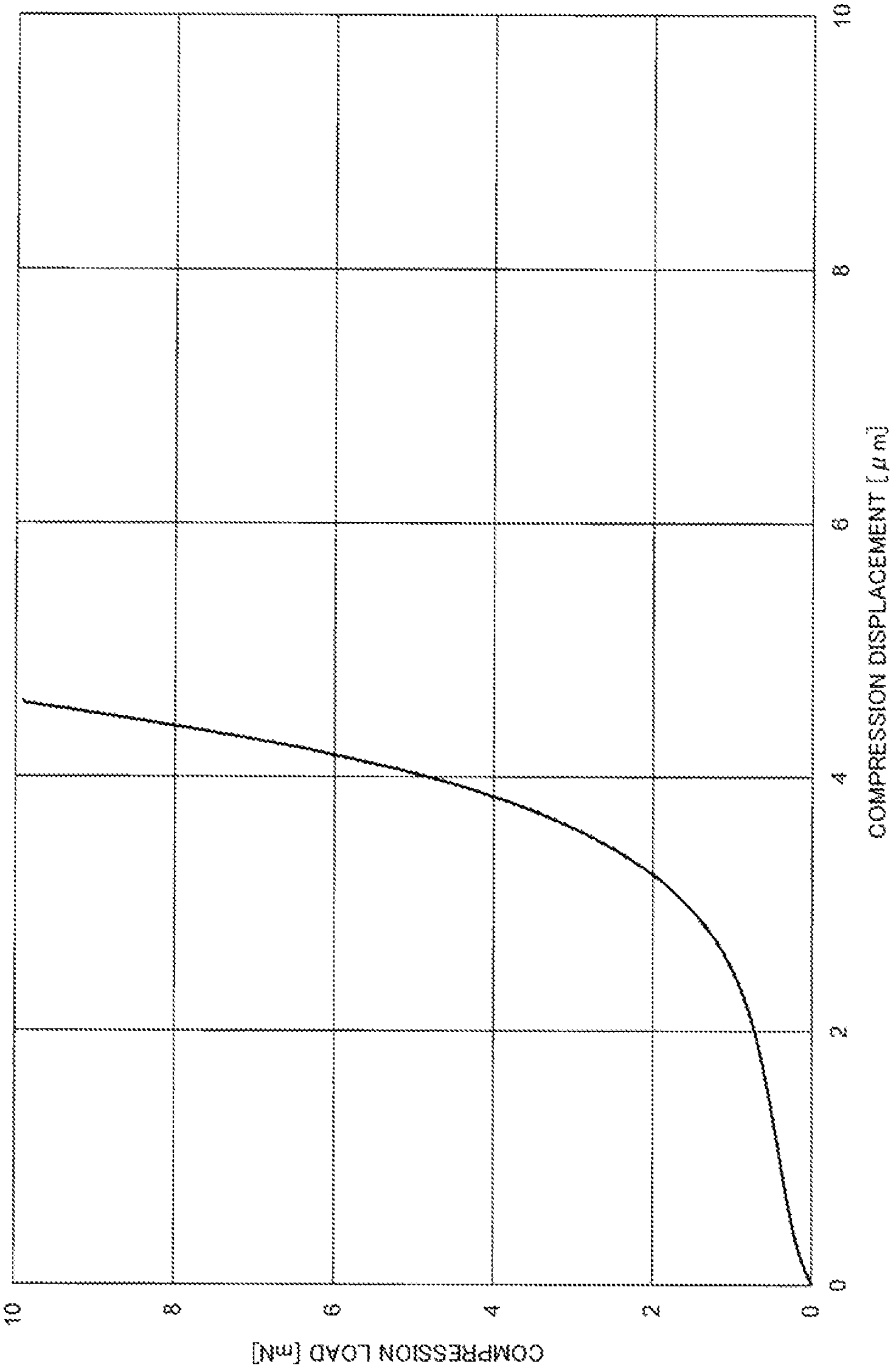
FIG. 7 is a compressive displacement-compressive load curve according to the fine resin particle of Example 7.
Figure 8:
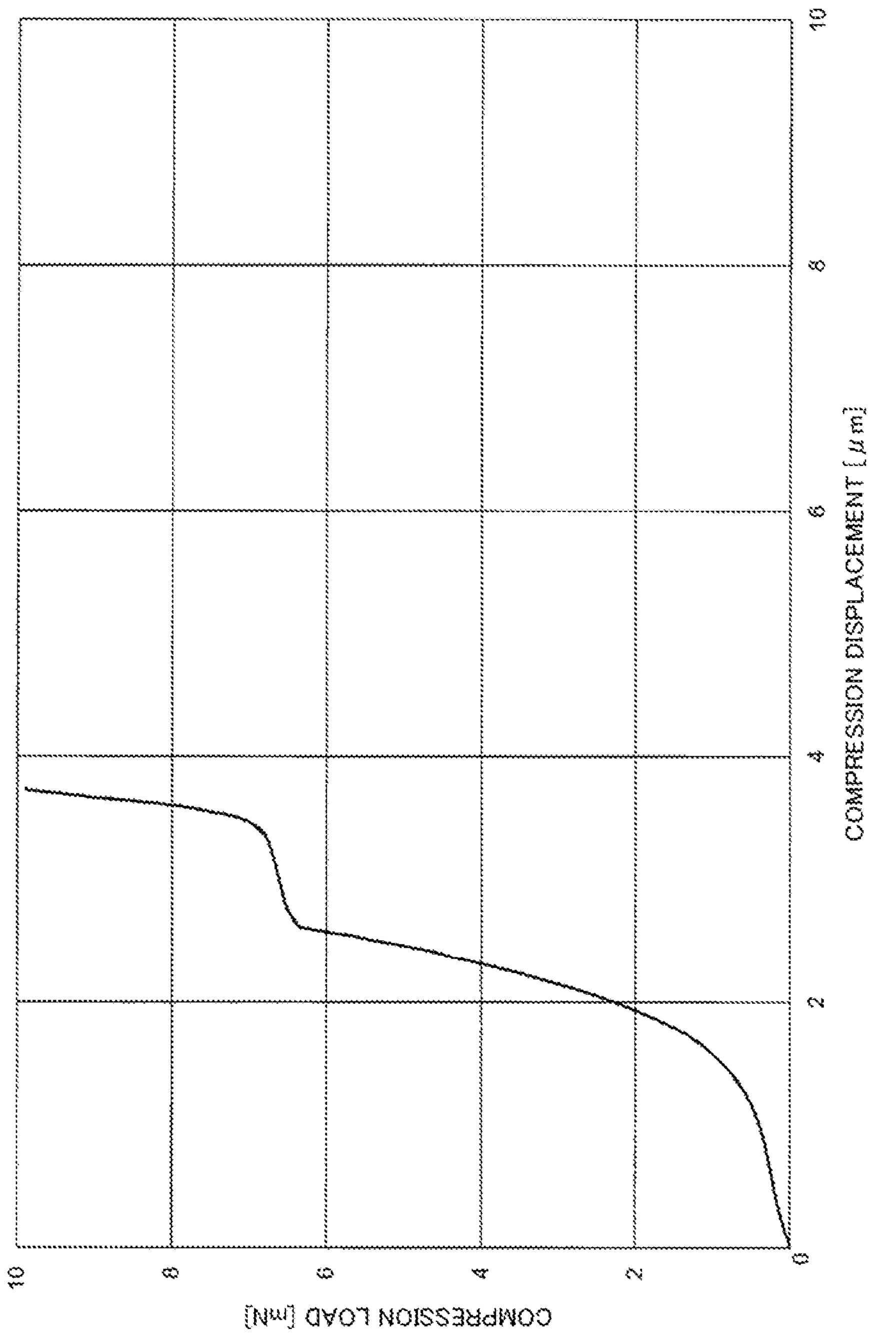
FIG. 8 is a compressive displacement-compressive load curve according to the fine resin particle of Comparative Example 1.
Figure 9:
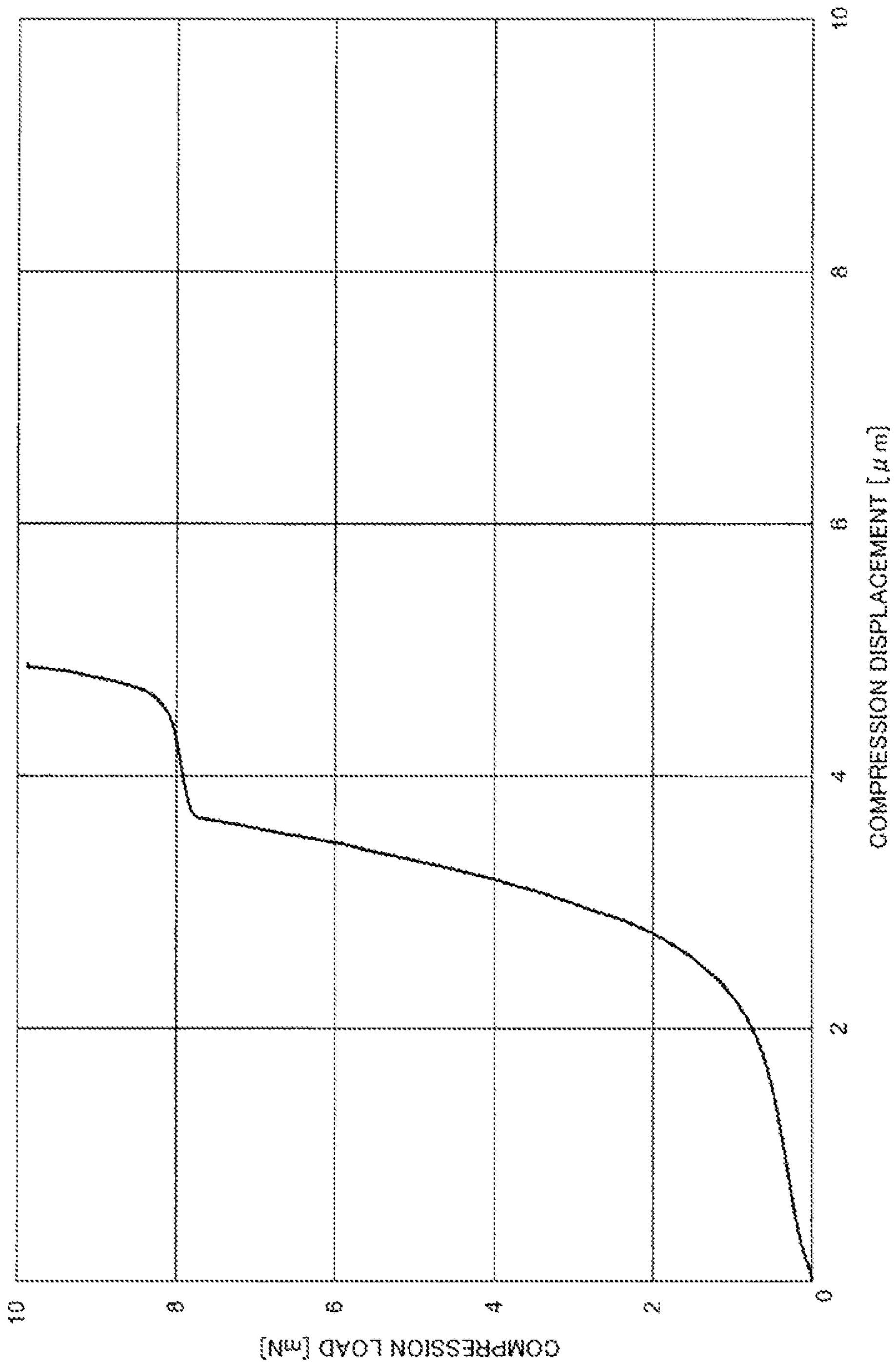
FIG. 9 is a compressive displacement-compressive load curve according to the fine resin particle of Comparative Example 2.
Figure 10:
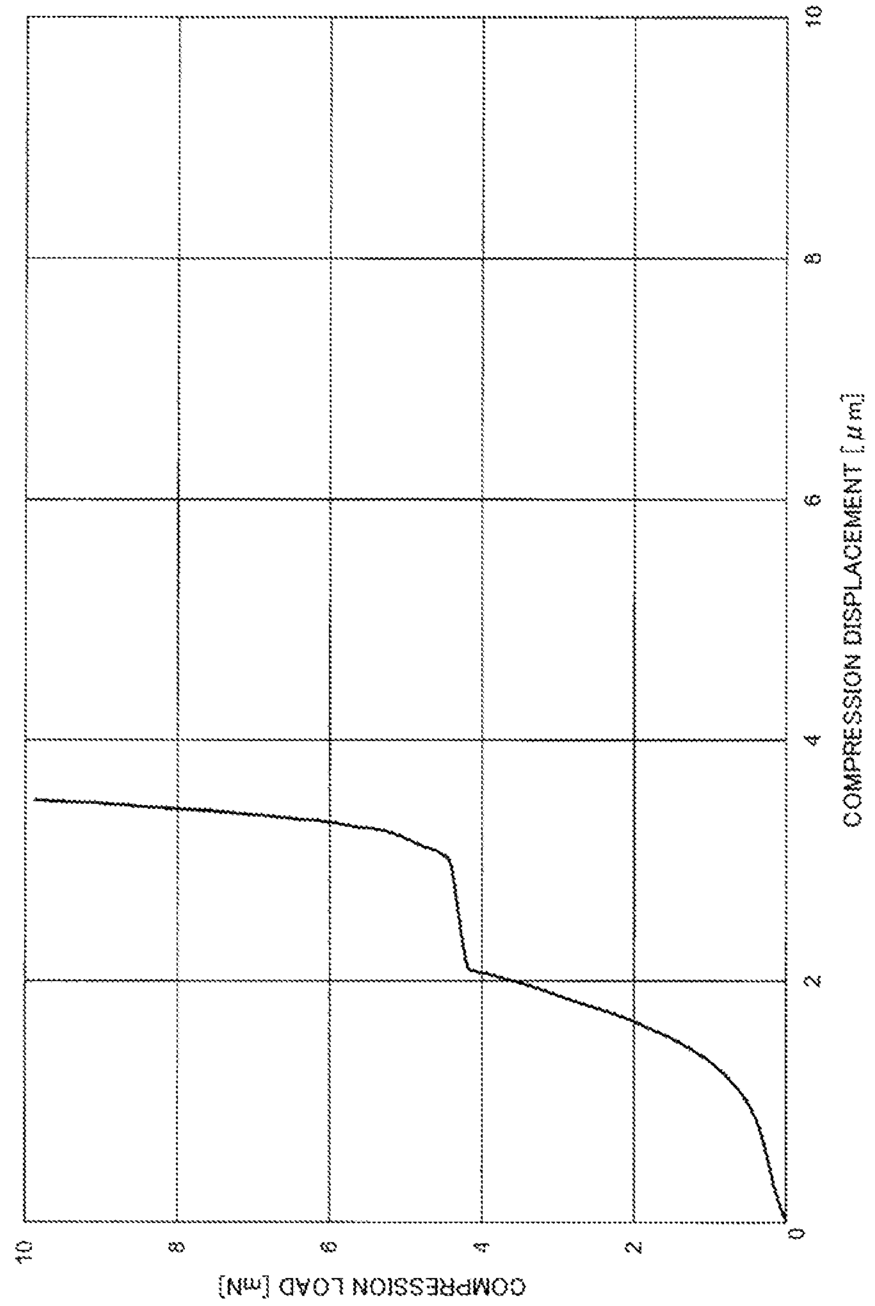
FIG. 10 is a compressive displacement-compressive load curve according to the fine resin particle of Comparative Example 3.
Figure 11:
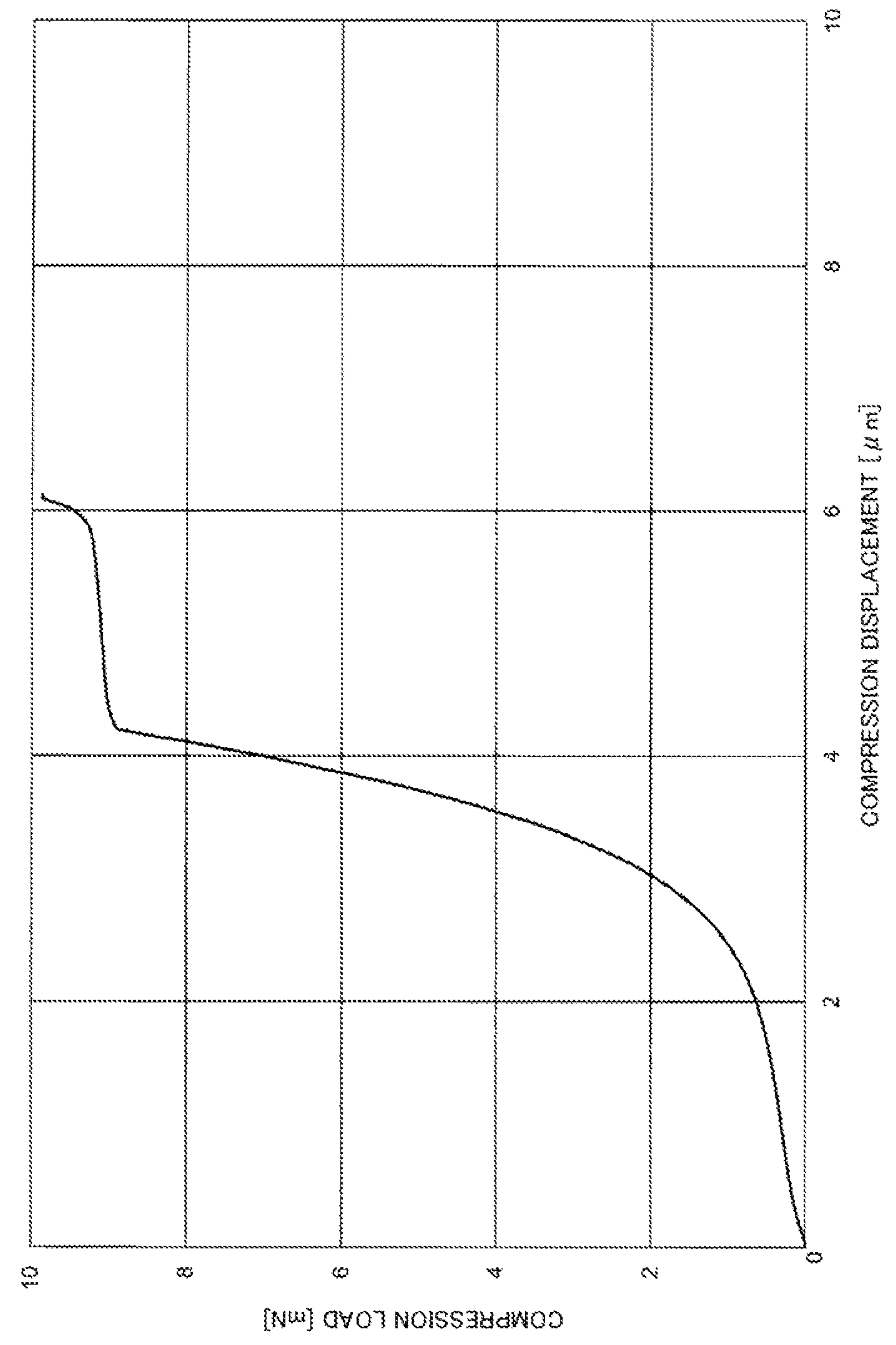
FIG. 11 is a compressive displacement-compressive load curve according to the fine resin particle of Comparative Example 4.

The compressive displacement-compressive load curve in the compression test was measured in the manner described above for the resulting fine resin particle, and whether an inflection point was present or absent when compressed to a load of 9.81 mN was shown in Table 2. The case with no inflection points was designated as "A", and the case with some inflection points was designated as "B". Compressive displacement-compressive load curves obtained in Examples and Comparative Examples are illustrated in FIGS. 1 to 11.

The fine resin particles after the compression test described above were observed using an optical microscope at 50× magnification, and the results thereof are listed in the column of "brittleness" in Table 1. The case where fine resin particles retain a round shape as viewed from the compression direction was designated as "A". The case where fine resin particles do not retain a round shape as viewed from the compression direction was designated as "B".

The thermal decomposition initiation temperatures under a nitrogen atmosphere and an air atmosphere were measured in the manner described above for the resulting fine resin particles, and the results thereof are shown in Table 2.

TABLE 2

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| (Meth)acrylate-based monomer (A) [parts by mass] | C13.0-MA | 60 | 60 | 40 | — | — | 40 | 50 | 95 | 80 | — | — |
| | C17.4-MA | — | — | — | 50 | 40 | — | — | — | — | 95 | 90 |
| Acryl acrylate-based monomer (B) [parts by mass] | MA | — | — | 20 | — | — | — | — | — | — | — | — |
| | BA | 10 | 10 | — | 20 | 30 | 20 | 22.5 | — | — | — | — |
| Vinyl monomer (C) [parts by mass] | MMA | 20 | 10 | — | — | 10 | 20 | 7.5 | — | 10 | — | — |
| | St | — | — | 10 | 20 | — | — | — | — | — | — | 10 |
| Multifunctional (meth)acrylate-based monomer(D) [parts by mass] | EGDMA | 10 | 20 | 30 | 10 | 20 | 20 | 20 | 5 | 10 | 5 | 10 |
| Polymerization initiator [parts by mass] | ABN-V | 0.5 | 0.5 | 0.5 | 0.5 | 0.5 | 0.5 | 0.5 | 0.5 | 0.5 | 0.5 | 0.5 |
| | BPO | 0.2 | 0.2 | 0.2 | 0.2 | 0.2 | 0.2 | 0.2 | 0.2 | 0.2 | 0.2 | 0.2 |
| Surfactants [parts by mass] | KAYAMER PM-21 | 0.3 | 0.3 | 0.3 | 0.3 | 0.3 | 0.3 | 0.3 | 0.3 | 0.3 | 0.3 | 0.3 |

TABLE 2-continued

| | | Examples | | | | | | | Comparative Examples | | | |
|---|---|---|---|---|---|---|---|---|---|---|---|---|
| | | 1 | 2 | 3 | 4 | 5 | 6 | 7 | 1 | 2 | 3 | 4 |
| Thiol-based compound (F) [parts by mass] | PETG | 0 | 0 | 0 | 0 | 0 | 1 | 1 | 0 | 0 | 0 | 0 |
| Hindered phenol-based antioxidant[parts by mass] | Irganox 1010 | 0 | 0 | 0 | 0 | 0 | 1 | 1 | 0 | 0 | 0 | 0 |
| Alkyl (meth)acrylate-based monomer (C1-3) unit [parts by mass] | | 22 | 13 | 33 | 0 | 13 | 25 | 9 | 0 | 11 | 0 | 0 |
| (C)/(D) | | 2.0 | 0.5 | 0.3 | 2.0 | 0.5 | 1.0 | 0.4 | 0 | 1.0 | 0 | 1.0 |
| Biomass degree [%] | | 50 | 51 | 34 | 40 | 38 | 35 | 42 | 74 | 65 | 77 | 64 |
| Volume average particle diameter [μm] | | 8.5 | 9.3 | 9.5 | 10.3 | 9.7 | 9.8 | 7.8 | 9.6 | 9.4 | 8.1 | 10.6 |
| CV value [%] | | 34.2 | 35.4 | 36.3 | 36.4 | 35.7 | 38.7 | 36.2 | 35.2 | 36.4 | 39.4 | 37.6 |
| S10 strength [MPa] | | 4.43 | 5.54 | 8.35 | 3.92 | 3.90 | 8.88 | 4.26 | 4.20 | 4.02 | 4.74 | 3.27 |
| Inflection point | | A | A | A | A | A | A | A | B | B | B | B |
| Brittleness | | A | A | A | A | A | A | A | B | B | B | B |
| Total amount of residual monomer [ppm] | | 100 | — | — | — | — | — | — | 1500 | 400 | 1800 | 700 |
| Thermal decomposition initiation temperatures under a nitrogen atmosphere [° C.] | | 277 | 278 | 314 | 321 | 294 | 340 | 342 | 243 | 252 | 263 | 308 |
| Thermal decomposition initiation temperatures under an air atmosphere [° C.] | | 233 | 230 | 244 | 232 | 235 | 315 | 310 | 226 | 231 | 237 | 239 |

INDUSTRIAL APPLICABILITY

The fine resin particle of the present invention has excellent softness and improved brittleness and, therefore, can be used in various applications. The fine resin particle can be suitably used for applications of paint compositions. The fine resin particle can be suitably used as a coating film-softening agent and a matting agent for paints.

CROSS-REFERENCE TO RELATED APPLICATIONS

This application claims priority to Japanese Patent Application No. 2021-60983, filed on Mar. 31, 2021, which is incorporated by reference in its entirety.

The invention claimed is:

1. A fine resin particle comprising a copolymer that includes an alkyl (meth)acrylate-based monomer (A) unit having a C10-30 alkyl group, an alkyl acrylate-based monomer (B) unit having a C1-5 alkyl group, a vinyl monomer (C) unit having a homopolymer glass transition temperature Tg of 70° C. or higher and one polymerizable unsaturated bond, and a multifunctional (meth)acrylate-based monomer (D) unit, wherein a content of the alkyl (meth)acrylate-based monomer (A) unit is 20 to 85 parts by mass in relation to 100 parts by mass of the total of the alkyl (meth) acrylate-based monomer (A) unit, the alkyl acrylate-based monomer (B) unit, the vinyl monomer (C) unit, and the multifunctional (meth)acrylate monomer-based (D) unit, wherein a content of the alkyl acrylate-based monomer (B) unit is 5 to 40 parts by mass in relation to 100 parts by mass of the total of the alkyl (meth)acrylate-based monomer (A) unit, the alkyl acrylate-based monomer (B) unit, the vinyl monomer (C) unit, and the multifunctional (meth)acrylate monomer-based (D) unit, wherein the alkyl acrylate-based monomer (B) does not have a hydrophilic structure, wherein a content of the vinyl monomer (C) unit is 5 to 30 parts by mass in relation to 100 parts by mass of the total of the alkyl (meth)acrylate-based monomer (A) unit, the alkyl acrylate-based monomer (B) unit, the vinyl monomer (C) unit, and the multifunctional (meth) acrylate monomer-based (D) unit, wherein the vinyl monomer (C) does not have a hydrophilic structure, wherein the multifunctional (meth)acrylate-based monomer (D) unit has a content of 5 to 50 parts by mass in relation to 100 parts by mass of the total of the alkyl (meth)acrylate-based monomer (A) unit, the alkyl acrylate-based monomer (B) unit, the vinyl monomer (C) unit, and the multifunctional (meth)acrylate-based monomer (D) unit, wherein a mass ratio of the content of the vinyl monomer (C) unit to the content of the multifunctional (meth) acrylate-based monomer (D) unit [vinyl monomer (C) unit content/multifunctional (meth)acrylate-based monomer (D) unit content] is 0.3 to 2, and wherein the fine resin particle shows no inflection point in a compressive displacement-compressive load curve in a compression test when the fine resin particle is compressed to a load of 9.81 mN and a primary particle of the fine resin particle has a compressive strength at 10% compressive strength upon initial compression at 25° C. of 1 to 10 MPa.

2. The fine resin particle according to claim 1, wherein the alkyl (meth)acrylate-based monomer (A) unit having a C10-30 alkyl group has a biomass degree of a homopolymer of the alkyl (meth)acrylate-based monomer (A) measured according to ASTM D 6866 of 60% or higher.

3. The fine resin particle according to claim 1, wherein the alkyl (meth)acrylate-based monomer (A) unit having a C10-30 alkyl group has a content of 20 to 85 parts by mass in relation to 100 parts by mass of all monomer units.

4. The fine resin particle according to claim 1, wherein the alkyl acrylate-based monomer (B) unit having a C1-5 alkyl group has a content of 5 to 40 parts by mass in relation to 100 parts by mass of all monomer units.

5. The fine resin particle according to claim 1, wherein the vinyl monomer (C) unit having a homopolymer glass transition temperature Tg of 70° C. or higher and one polymerizable unsaturated bond has a content of 5 to 30 parts by mass in relation to 100 parts by mass of all monomer units.

6. The fine resin particle according to claim 1, wherein the multifunctional (meth)acrylate-based monomer (D) unit has a content of 5 to 50 parts by mass in relation to 100 parts by mass of all monomer units.

7. The fine resin particle according to claim 1, wherein, in relation to 100 parts by mass of all monomer units, the alkyl (meth)acrylate-based monomer (A) unit having a C10-30 alkyl group has a content of 20 to 85 parts by mass, the alkyl acrylate-based monomer (B) unit having a C1-5 alkyl group has a content of 5 to 40 parts by mass, the vinyl monomer (C) unit having a homopolymer glass transition temperature Tg of 70° C. or higher and one polymerizable unsaturated bond has a content of 5 to 30 parts by mass, and the multifunctional (meth)acrylate-based monomer (D) unit has a content of 5 to 50 parts by mass.

8. The fine resin particle according to claim 1, wherein the fine resin particle has a thermal decomposition initiation temperature under a nitrogen atmosphere of 280° C. or higher.

9. The fine resin particle according to claim 1, where the fine resin particle has a thermal decomposition initiation temperature under an air atmosphere of 280° C. or higher.

10. The fine resin particle according to claim 1, wherein the fine resin particle has a total amount of residual monomers in relation to the total mass of the resin particle of 1,000 ppm or less.

11. A coating film-softening agent comprising the fine resin particle according to claim 1.

12. A matting agent for paints, comprising the fine resin particle according to claim 1.

13. A stress reliever for curable resins, comprising the fine resin particle according to claim 1.

14. A light diffuser comprising the fine resin particle according to claim 1.

15. A resin composition comprising the fine resin particle according to claim 1 and a synthetic resin.

16. A light diffusing resin composition comprising the fine resin particle according to claim 1.

* * * * *